(12) United States Patent
 Shi et al.

(10) Patent No.: US 11,039,479 B2
(45) Date of Patent: Jun. 15, 2021

(54) INFORMATION TRANSMISSION METHOD AND APPARATUS, RANDOM ACCESS METHOD AND APPARATUS, AND COMMUNICATION SYSTEM

(71) Applicant: FUJITSU LIMITED, Kawasaki (JP)

(72) Inventors: Yulong Shi, Beijing (CN); Meiyi Jia, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/505,091

(22) Filed: Jul. 8, 2019

(65) Prior Publication Data

US 2019/0335512 A1 Oct. 31, 2019

Related U.S. Application Data

(63) Continuation of application No. PCT/CN2017/103674, filed on Sep. 27, 2017.

(51) Int. Cl.
 *H04W 72/04* (2009.01)
 *H04W 4/00* (2018.01)
 (Continued)

(52) U.S. Cl.
 CPC ....... *H04W 74/0833* (2013.01); *H04W 74/02* (2013.01); *H04W 76/11* (2018.02); *H04W 80/02* (2013.01)

(58) Field of Classification Search
 CPC ............. H04W 36/0077; H04W 76/27; H04W 36/0005; H04W 72/1284; H04W 88/08;
 (Continued)

(56) References Cited

U.S. PATENT DOCUMENTS

2014/0092855 A1* 4/2014 Ahn ................... H04W 74/006
 370/329
2015/0304891 A1* 10/2015 Dinan .................... H04L 69/28
 370/331

(Continued)

FOREIGN PATENT DOCUMENTS

| CN | 102595636 A | 7/2012 |
| CN | 106941730 A | 7/2017 |
| CN | 107026721 A | 8/2017 |

OTHER PUBLICATIONS

International Search Report issued by the State Intellectual Property Office of the P.R. China for corresponding International Patent Application No. PCT/CN2017/103674, dated Jun. 19, 2018, with an English translation.

(Continued)

*Primary Examiner* — Sai Aung
(74) *Attorney, Agent, or Firm* — Myers Wolin, LLC

(57) ABSTRACT

An information transmission method and apparatus, a random access method and apparatus, and a communication system. The information transmission apparatus includes: a first transmitting unit configured to transmit symbol identification information to UE, the symbol identification information indicating relevant information of a symbol used by a random access preamble sequence transmitted by the UE. Hence, the random access response transmitted in the random access response message may be differentiated according to the symbol identification information, and the problems existed in the related art may be solved.

10 Claims, 18 Drawing Sheets

(51) Int. Cl.
   *H04W 74/08*   (2009.01)
   *H04W 76/11*   (2018.01)
   *H04W 74/02*   (2009.01)
   *H04W 80/02*   (2009.01)

(58) Field of Classification Search
   CPC .............. H04W 72/04; H04W 72/042; H04W 36/0072; H04W 72/0413; H04W 36/08; H04W 36/38; H04W 56/0015
   See application file for complete search history.

(56) References Cited

U.S. PATENT DOCUMENTS

| | | | | |
|---|---|---|---|---|
| 2015/0351132 | A1* | 12/2015 | Park | H04W 74/0833 370/336 |
| 2015/0359034 | A1* | 12/2015 | Kim | H04W 24/10 370/328 |
| 2018/0124824 | A1* | 5/2018 | Lee | H04W 48/16 |
| 2018/0255586 | A1* | 9/2018 | Einhaus | H04L 5/0082 |
| 2019/0274168 | A1* | 9/2019 | Hwang | H04L 27/2602 |

OTHER PUBLICATIONS

Written Opinion of the International Searching Authority issued by the State Intellectual Property Office of the P.R. China for corresponding International Patent Application No. PCT/CN2017/103674, dated Jun. 19, 2018, with an English translation.

Mediatek, Inc. "NR 4-step RACH procedure," Agenda item: 6.1.4.2, 3GPP TSG RAN WG1 Meeting NR#3, R1-1716219, Nagoya, Japan, Sep. 18-21, 2017.

Huawei et al., "Discussion on MAC PDU format for RAR," Agenda item: 10.3.1.3, 3GPP TSG-RAN WG2 Meeting #99, R2-1708262, Berlin, Germany, Aug. 21-25, 2017.

Notice of Reasons for Refusal issued by the Japan Patent Office for corresponding Japanese Patent Application No. 2020-514697, dated Mar. 23, 2021, with an English translation.

Fujitsu, "Multiple other SI requests in MSG1", Agenda item: 10.4.1.5.5, 3GPP TSG-RAN WG2 Meeting #99, R2-1708870 (Resubmission of R2-1706566), Berlin, Germany, Aug. 21-25, 2017.

* cited by examiner

501 a random access response message is transmitted to a UE, the random access response message including data type indication information, the data type indication information indicating a data format and/or a use of an MAC subheader or an MAC sub-data unit to which it corresponds; wherein, the data format includes a first data format which contains a preamble sequence identifier, but does not contain random access response data to which the preamble sequence identifier corresponds, and the use includes a first use indicating acknowledgement of an on-demand system information request

FIG. 5

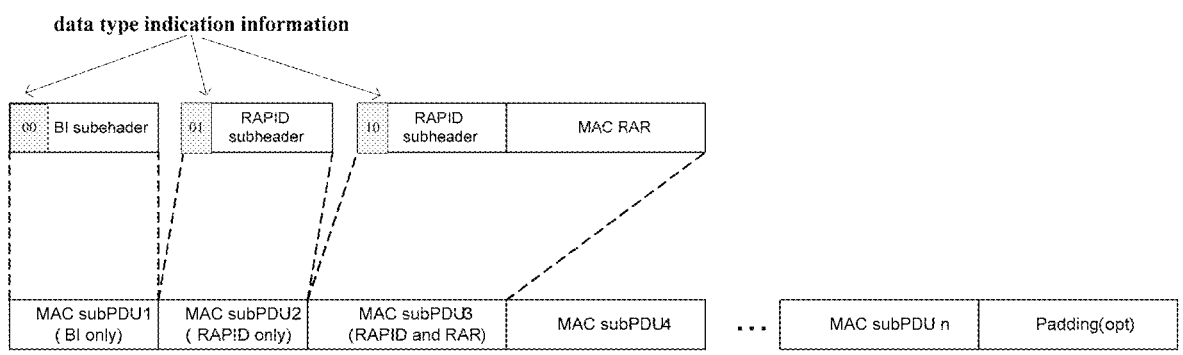

FIG. 6

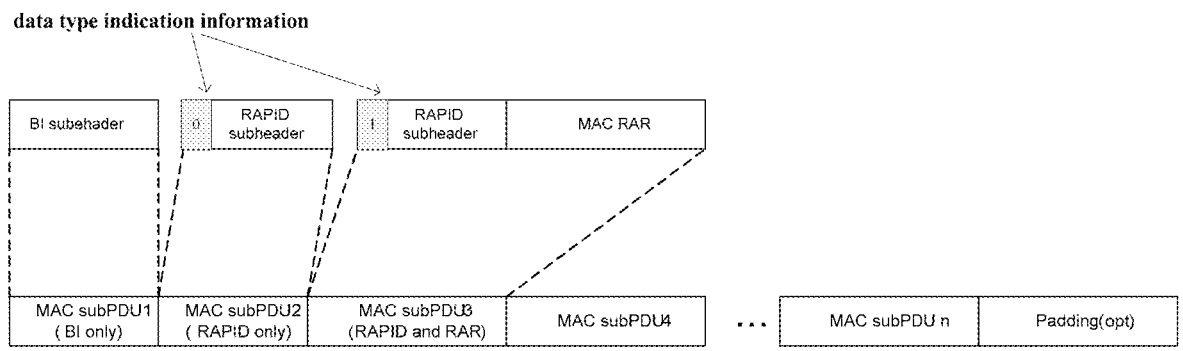

FIG. 7

801 a random access response message is received, the random access response message containing data type indication information, the data type indication information indicating a data format and/or use of an MAC sub-data unit or an MAC sub-data unit to which it corresponds; wherein, the data format includes a first data format which contains a preamble sequence identifier, but does not contain random access response data to which the preamble sequence identifier corresponds, and the use includes a first use indicating acknowledgement of an on-demand system information request

FIG. 8

901 a random access response message is received

902 when an MAC subheader or an MAC sub-data unit to which the MAC subheader corresponds in the random access response message contains a random access preamble sequence identifier and the random access preamble sequence identifier belongs to a preconfigured sequence identifier set of random access preamble sequences used for an on-demand system information request, it is determined that a use of the MAC subheader or the MAC sub-data unit to which the MAC subheader corresponds is to indicate acknowledgement of the on-demand system information request, or when an MAC subheader or an MAC sub-data unit to which the MAC subheader corresponds in the random access response message contains a random access preamble sequence identifier and the random access preamble sequence identifier does not belong to a preconfigured sequence identifier set of random access preamble sequences used for an on-demand system information request, it is determined that a use of the MAC subheader or the MAC sub-data unit to which the MAC subheader corresponds is to indicate a normal random access response

FIG. 9

1001 a random access response message is received; wherein, the random access response message contains multiple MAC subheaders or MAC sub-data units to which the MAC subheaders correspond; and wherein, a position of an MAC subheader or an MAC sub-data unit to which the MAC subheader corresponds containing a random backoff indication message is located at the last of all the MAC subheaders or MAC subdata units to which the MAC subheaders correspond

FIG. 10

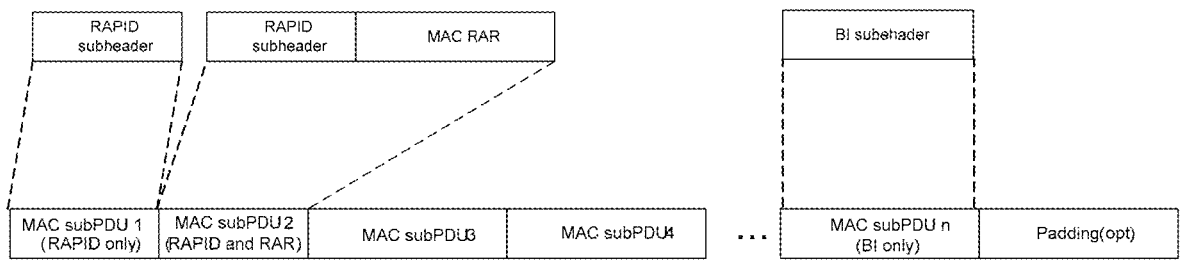

INFORMATION TRANSMISSION METHOD AND APPARATUS, RANDOM ACCESS METHOD AND APPARATUS, AND COMMUNICATION SYSTEM

CROSS REFERENCE TO RELATED APPLICATIONS

This application is a continuation application of International Application PCT/CN2017/103674 filed on Sep. 27, 2017, the entire contents of which are incorporated herein by reference.

FIELD

This disclosure relates to the field of communication technologies, and in particular to an information transmission method and apparatus, a random access method and apparatus, and a communication system.

BACKGROUND

In a long term evolution (LTE) system, a random access procedure includes a contention-based random access procedure and a non-contention based random access procedure. In the contention-based random access procedure, a random access preamble is shared between different a UE, and in a non-contention based random access procedure, a base station may specify a random access preamble sequence for the UE.

In the LTE system, a time domain position at which the UE transmits a random access preamble sequence refers to a subframe, and a network side may configure the subframe via a random access resource. When subframes occupied by different UEs in transmitting random access preamble sequences are different, random access responses (RARs) of different UEs are differentiated by using different random access radio network temporary identities (RA-RNTIs) to scramble physical downlink control channels (PDCCHs), and when the subframes occupied by different UEs in transmitting random access preamble sequences are identical, RARs of different UEs are differentiated by using random access preamble identities (RAPIDs).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In a future wireless communication system, such as a 5G or a new radio (NR) system, a time-domain position of the UE for transmitting a random access preamble sequence refers to not only a subframe, but also a timeslot occupied and a symbol used in transmitting the random access preamble sequence. Hence, when subframes and timeslots occupied in transmitting random access preamble sequences by different UEs are all identical, the UE usually receives random access responses at identical or similar time instances, and random access responses of different UEs are suitable for being multiplexed in the same random access response message (msg.2). And if existing mechanisms are still followed, random access responses transmitted to different UEs are unable to be differentiated according only to RA-RNTIs and RAPIDs.

In order to solve the above problem, embodiments of this disclosure provide an information transmission method and apparatus and a communication system, which may assist UE in differentiating random access responses transmitted in a random access response message.

According to a first aspect of the embodiments of this disclosure, there is provided an information transmission apparatus, including: a first transmitting unit configured to transmit symbol identification information to a UE, the symbol identification information indicating relevant information of a symbol used by a random access preamble sequence transmitted by the UE.

According to a second aspect of the embodiments of this disclosure, there is provided an information transmission apparatus, including: a first receiving unit configured to receive symbol identification information transmitted by a network side, the symbol identification information indicating relevant information of a symbol used by a UE in transmitting a random access preamble sequence.

According to a third aspect of the embodiments of this disclosure, there is provided a random access apparatus, including: a second transmitting unit configured to transmit a random access response message to a UE, the random access response message including data type indication information, the data type indication information indicating a data format and/or use of an MAC subheader or an MAC sub-data unit; wherein, the data format includes a first data format which contains a preamble sequence identifier, but does not contain random access response data to which the preamble sequence identifier corresponds, and the use includes a first use indicating acknowledgement of an on-demand system information request.

According to a fourth aspect of the embodiments of this disclosure, there is provided a random access apparatus, including: a second receiving unit configured to receive a random access response message, the random access response message including data type indication information, the data type indication information indicating a data format and/or use of an MAC sub-data unit; wherein, the data format includes a first data format which contains a preamble sequence identifier, but does not contain random access response data to which the preamble sequence identifier corresponds, and the use includes a first use indicating acknowledgement of an on-demand system information request.

According to a fifth aspect of the embodiments of this disclosure, there is provided a random access apparatus, including: a third receiving unit configured to receive a random access response message; and a first determining unit configured to, when an MAC subheader or an MAC sub-data unit to which the MAC subheader corresponds in the random access response message contains a random access preamble sequence identifier and the random access preamble sequence identifier belongs to a preconfigured sequence identifier set of random access preamble sequences used for an on-demand system information request, determine that a use of the MAC subheader or the MAC sub-data unit to which the MAC subheader corresponds is to indicate acknowledgement of the on-demand system information request, or when an MAC subheader or an MAC sub-data unit to which the MAC subheader corresponds in the random access response message contains a random access preamble sequence identifier and the random access preamble sequence identifier does not belong to preconfigured a sequence identifier set of random access preamble sequences used for an on-demand system information request, determine that a use of the MAC subheader or the MAC sub-data unit to which the MAC subheader corresponds is to indicate a normal random access response.

According to a sixth aspect of the embodiments of this disclosure, there is provided a random access apparatus, including: a third transmitting unit configured to transmit a random access response message; wherein, the random access response message contains a plurality of MAC subheaders or MAC sub-data units to which the MAC subheaders correspond; and wherein, a position of an MAC subheader or an MAC sub-data unit to which the MAC subheader corresponds containing a random backoff indication message is located at the last of all the MAC subheaders or MAC sub-data units to which the MAC subheaders correspond.

According to a seventh aspect of the embodiments of this disclosure, there is provided a random access apparatus, including: a fourth receiving unit configured to receive a random access response message; wherein, the random access response message contains a plurality of MAC subheaders or MAC sub-data units to which the MAC subheaders correspond; and wherein, a position of an MAC subheader or an MAC sub-data unit to which the MAC subheader corresponds containing a random backoff indication message is located at the last of all the MAC subheaders or MAC subdata units to which the MAC subheaders correspond.

According to an eighth aspect of the embodiments of this disclosure, there is provided a random access apparatus, including: an indicating unit configured to indicate a random access preamble sequence by using first indication information and second indication information.

According to a ninth aspect of the embodiments of this disclosure, there is provided a random access apparatus, including: a determining unit configured to determine a random access preamble sequence by using first indication information and second indication information.

An advantage of the embodiments of this disclosure exists in that the UE may receive the symbol identification information fed back by the network side, and differentiate random access responses transmitted in a random access response message according the symbol identification information, thereby solving the problem existed in the related art.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 5 is a flowchart of the random access method of Embodiment 4 of this disclosure;

FIGS. 6 and 7 are schematic diagrams of a format of a random access response of Embodiment 4 of this disclosure;

FIG. 8 is a flowchart of the random access method of Embodiment 5 of this disclosure;

FIG. 9 is a flowchart of the random access method of Embodiment 6 of this disclosure;

FIG. 10 is a flowchart of the random access method of Embodiment 7 of this disclosure;

FIG. 11 is a schematic diagram of a random access response message of Embodiment 7 of this disclosure;

DETAILED DESCRIPTION

Figure 1:
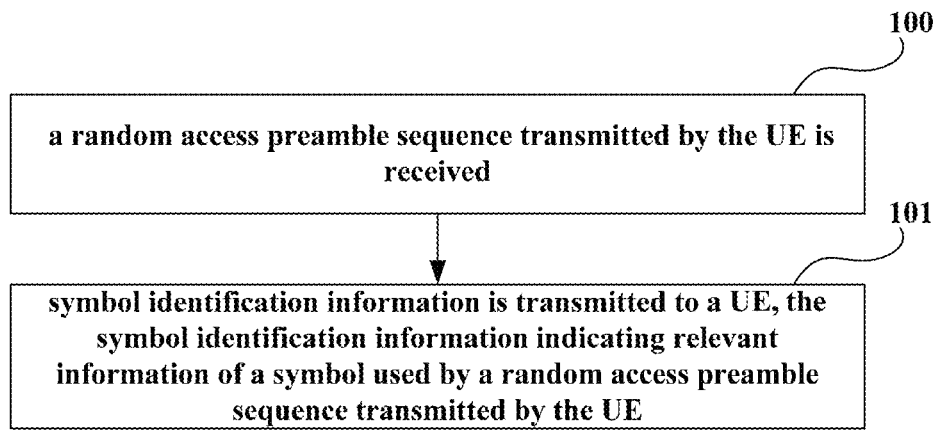
FIG. 1 is a flowchart of the information transmission method of Embodiment 1 of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various implementations of the embodiments of this disclosure shall be described with reference to the accompanying drawings. These implementations are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G 2.5G 2.75G 3G 4G 4.5G and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, a random access procedure may be a contention-based random access procedure, or may be a non-contention-based random access procedure. For example, according to whether a network device is able to uniquely identify a random access procedure of a certain piece of a UE, a random access procedure is divided into a contention-based random access procedure and a non-contention-based random access procedure.

The embodiments of this disclosure shall be described below with reference to the accompanying drawings.

Embodiment 1

An embodiment provides an information transmission method, which is applicable to a network device side, such as being applicable to an apparatus making response to a random access procedure initiated by a UE.

FIG. 1 is a flowchart of the information transmission method of the embodiment of this disclosure. As shown in FIG. 1, the method includes:

block 101: symbol identification information is transmitted to a UE, the symbol identification information indicating relevant information of a symbol used by a random access preamble sequence transmitted by the UE.

It can be seen from the above embodiment that the UE may receive the symbol identification information fed back by the network side, and differentiate a random access response transmitted in a random access response message according to the symbol identification information, thereby solving the problem existing in the related art.

In an embodiment, when the UE initiates a random access procedure, the UE transmits a random access preamble sequence to the network device side. The random access procedure may be a contention-based random access procedure or a non-contention based random access procedure.

In one implementation, for the contention-based random access procedure, the UE selects a random access preamble sequence preamble in a random access preamble sequence set and a resource in a random access resource set to transmit the random access preamble sequence.

In another implementation, for a non-contention based random access procedure, the network device may allocate a dedicated random access preamble sequence, and/or a random access resource (such as a random access channel (RACH) resource), and/or a random access preamble format, for the UE, and the UE transmits the random access preamble sequence according to the allocation of the network side.

In an embodiment, a time domain position of the UE for transmitting the random access preamble sequence may include subframes, timeslots, and used symbols; wherein, each subframe length is equal to Xms, and is constituted by Y consecutive timeslots, and each timeslot is constituted by Z orthogonal frequency division multiplexing (OFDM) symbols; wherein, reference may be made to the related art for X, Y and Z; for example, they are equal to 1, 2, 7, respectively; however, the embodiment is not limited thereto.

In an embodiment, the symbol identifier information indicates relevant information on the symbol used by the UE in transmitting the random access preamble sequence. For example, the relevant information may be information on a position of a symbol occupied in the time domain by the random access preamble sequence transmitted by the UE; wherein, the information on position may be a symbol ID, or may be a spacing between a symbol position and a predetermined position, or may be a pattern index of a symbol position for transmitting a random access preamble sequence configured by the network; however, the embodiment is not limited thereto.

In an embodiment, the symbol identification information may be a field of a predetermined number A of bits; where, a value of A may be determined according to the number of OFDM symbols contained in one timeslot; for example, when 14 OFDM symbols are contained in one timeslot, the symbol identification information is a field of 4 bits; however, the embodiment is not limited thereto, and when the number of OFDM symbols contained in a timeslot increases, the number of A increases correspondingly.

In an embodiment, before block 101, the method may further include:

block 100: a random access preamble sequence transmitted by the UE is received.

In an embodiment, in the random access procedure, in receiving the random access preamble sequence transmitted by the UE, the network side will feed back a random access response message (msg.2) to the UE; wherein, the symbol identification information may be transmitted via the random access response message. However, the embodiment is not limited thereto; for example, the symbol identification information may also be transmitted via a newly-established message or another existing message, and the newly-established message or the other existing message may be transmitted simultaneously with the random access response message, or may be transmitted nonsimultaneously, and the embodiment is not limited thereto.

In an embodiment, in receiving the random access preamble sequence transmitted by the UE, the network side may calculate the RA-RNTI according to the subframe and the occupied timeslot in which transmitting the random access preamble sequence, and scramble the PDCCH by using the RA-RNTI; the network side indicates a downlink grant of msg.2 via the PDCCH, and the UE side may descramble the PDCCH according to the RA-RNTI, so as to read msg.2; wherein, reference may be made to the related art for a method for calculating the RA-RNTI and methods for scrambling and descrambling the RA-RNTI, which shall not be described herein any further.

Figure 2:
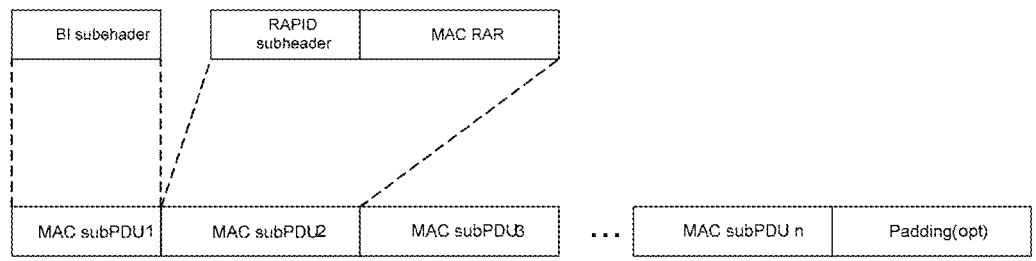
FIG. 2 is a schematic diagram of a format of a random access response of Embodiment 1 of this disclosure.

In an embodiment, reference may be made to the related art for the format of the random access response message. FIG. 2 is a schematic diagram of a format of a random access response message in the related art. As shown in FIG. 2, the random access response message may include a media access control (MAC) layer sub-header, at least one MAC sub-data unit (sub PDU) to which the MAC sub-header corresponds and padding information (optional); wherein, different MAC sub-data units correspond to results of the different responses of random access preamble sequences transmitted by a UE, and the random access preamble sequences may be transmitted by the same UE, or may be transmitted by different UEs. For example, when the network side acknowledges that the UE may perform random access, random access response (RAR) may be contained in the MAC sub-data unit, indicating acknowledgment of a request for random access. And wherein, the MAC sub-data unit may further include an RAPID, and other information. Reference may be made to the related art for details, which shall not be described herein any further.

In an embodiment, the symbol identification information may be contained in the MAC sub-header or MAC sub-data unit to which the MAC sub-header corresponds.

It can be seen from the above embodiment that the UE may receive the symbol identification information fed back by the network side, and differentiate random access responses transmitted in a random access response message according the symbol identification information, thereby solving the problem existed in the related art.

Embodiment 2

Embodiment 2 of this disclosure provides an information transmission method, which is applicable to a UE side, such as being applicable to an apparatus initiating a random access procedure to a network side.

Figure 3:
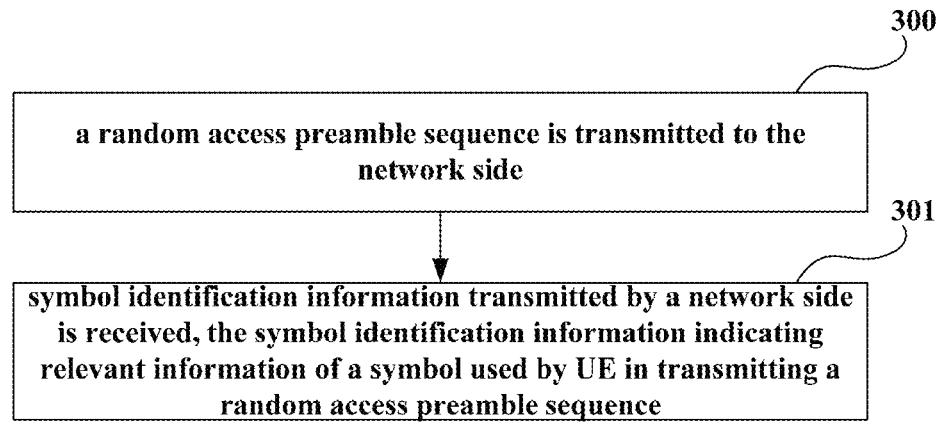
FIG. 3 is a flowchart of the information transmission method of Embodiment 2 of this disclosure.

FIG. 3 is a flowchart of the information transmission method of the embodiment of this disclosure. As shown in FIG. 3, the method includes:

block 301: symbol identification information transmitted by a network side is received, the symbol identification information indicating relevant information of a symbol used by a UE in transmitting a random access preamble sequence.

In an embodiment, reference may be made to Embodiment 1 for a particular meaning of the symbol identification information, which shall not be described herein any further.

In an embodiment, the method further includes:

block 300, a random access preamble sequence is transmitted to the network side.

In an embodiment, after the UE transmits the random access preamble sequence, the network side feeds back a random access response message to the UE according to the random access preamble sequence; wherein, the symbol identifier may be contained in the random access response message. And wherein, reference may be made to Embodiment 1 for a format of the random access response message, and reference may be made to the related art for a format of the random access preamble sequence and a resource for transmitting the random access preamble sequence, which shall not be described herein any further.

In an embodiment, the method may further include a block (not shown): monitoring the random access response message, and receiving the random access response message via the monitoring process; wherein, a monitoring period may be preconfigured by the network side, which may be an RAR window; for example, the RAR window may start from a subframe where the UE transmits a random access preamble sequence plus 3 subframes, and has a length of P subframes, P being a positive integer.

In an embodiment, the UE may calculate the RA-RNTI according to the subframe and the occupied timeslot or other information in which transmitting the random access preamble sequence, and descramble the PDCCH by using the RA-RNTI. When the descrambling is successful, the UE reads the random access response message transmitted by the network side at a physical downlink shared channel (PDSCH), and distinguishes according to the symbol identification information contained in the random access response message whether the random access response transmitted in the random access response message is transmitted to the UE itself.

In an embodiment, the method may further include:

block 302: it is judged whether random access response data contained in the random access response message transmitted by the network side are successfully received by using the symbol identification information.

For example, the random access response data is the random access response (RAR), which is used to indicate that the network side acknowledges that the UE may perform a subsequent random access procedure; and furthermore, the random access response data being successfully received indicates that the random access response data is transmitted to the UE itself, and is not transmitted to other UE.

In one implementation of block 302, the UE judges whether the position of the symbol indicated by the symbol identification information is in consistence with the position of the symbol occupied in a time domain by the random access preamble sequence transmitted by the UE, and determined that the random access response data contained in the random access response message are successfully received when a judgment result is yes; wherein, being in consistence may denote corresponding or being identical.

For example, when the relevant information of the symbol indicated by the symbol identification information is a symbol ID, the UE compares the symbol ID with an ID of the symbol occupied by the random access preamble sequence transmitted in the time domain in block 300, and when they are consistent, it shows that the random access response data is transmitted to the UE itself, that is, the random access response data is successfully received.

For example, when the relevant information of the symbol indicated by the symbol identification information is a pattern index of the position of the symbol transmitting the random access preamble sequence configured by the network, the UE compares the index with the symbol occupied in the time domain by random access preamble sequence transmitted by it in block 300, and when they are corresponding, it shows that the random access response data is transmitted to the UE itself, that is, the random access response data is successfully received.

In one implementation of block 302, the UE judges whether the position of the symbol indicated by the symbol identification information is in consistence with the position of the symbol occupied in a time domain by the random access preamble sequence transmitted by the UE, judges whether a random access preamble sequence identifier contained in the random access response message is in consistence with a random access preamble sequence identifier transmitted by the UE, and determines that the random access response data contained in the random access response message are successfully received when both judgment results are yes; wherein, being in consistence may denote corresponding or being identical.

In an implementation, the random access response message may contain both the symbol identification information and the random access preamble sequence identifier (RAPID). For example, when the relevant information of the symbol indicated by the symbol identification information is a symbol ID, the UE compares the symbol ID with the ID of the symbol occupied in the time domain by the random access preamble sequence transmitted in block 300, and compares the RAPID contained in the random access response message with the identifier of the random access preamble sequence transmitted in block 300. And when they are all consistent, it shows that the random access response data is transmitted to the UE itself, that is, the random access response data is successfully received.

For example, when the relevant information of the symbol indicated by the symbol identification information is a pattern index of the position of the symbol transmitting the random access preamble sequence configured by the network, the UE compares the index with the symbol occupied in the time domain by random access preamble sequence transmitted by it in block 300, and compares the RAPID contained in the random access response message with the identifier of the random access preamble sequence transmitted in block 300. And when they are all consistent, it shows that the random access response data is transmitted to the UE itself, that is, the random access response data is successfully received.

It can be seen from the above embodiment that the UE may receive the symbol identification information fed back by the network side, and differentiate random access responses transmitted in a random access response message according the symbol identification information, thereby solving the problem existed in the related art.

Embodiment 3

Figure 4:
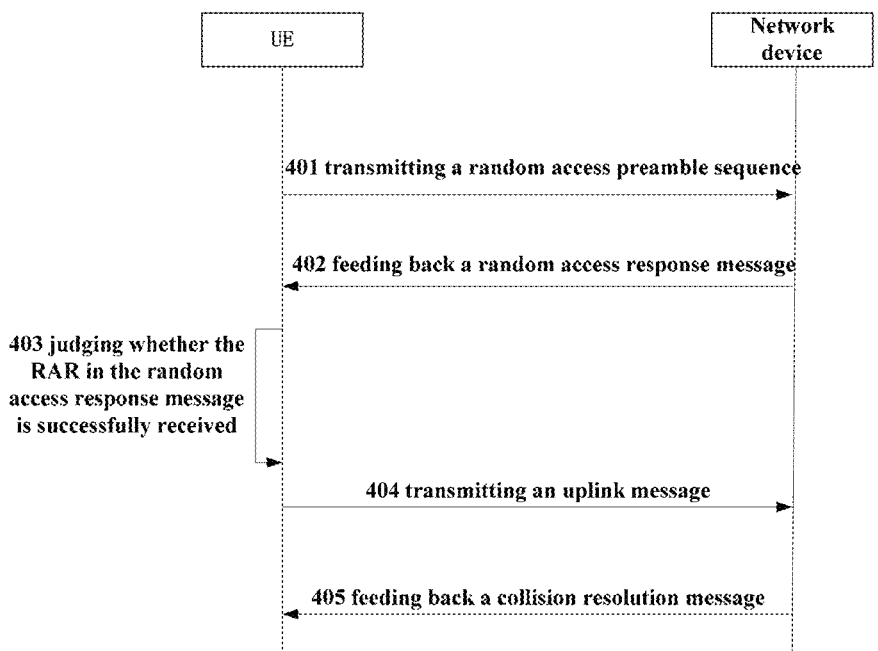
FIG. 4 is a flowchart of the random access method of Embodiment 3 of this disclosure.

Embodiment 3 of this disclosure provides an information transmission method. FIG. 4 is a flowchart of the information transmission method of Embodiment 3 of this disclosure. As shown in FIG. 4, the method includes:

block 401: a UE transmits a random access preamble sequence (msg.1) to a network side;

block 402: the network side receives at least one random access preamble sequence, and feeds back a random access response message (msg. 2) to the UE;

wherein, the random access response contains symbol identification information, the symbol identification information indicating relevant information of a symbol used by a random access preamble sequence transmitted by the UE;

reference may be made to Embodiment 1 for a particular transmission method, which shall not be described here any further;

block 403: the UE receives the random access response message fed back by the network side, and judges whether the RAR in the random access response message is successfully received according to the symbol identification information contained in the received random access response message, or the RAPID and the symbol identification information contained in the received random access response message, a particular judgment method being as described in Embodiment 2, which shall not be described here any further;

wherein, the UE may receive the random access response message fed back by the network side by monitoring; and wherein, the UE may perform monitoring within a preconfigured time window; and in performing the monitoring, the UE may calculate the RA-RNTI according to the subframe and the occupied timeslot in which transmitting the random access preamble sequence, descramble the PDCCH by using the RA-RNTI, and receive the random access response message fed back by the network side when the descrambling is successful;

block 404: upon successful reception, the UE transmits an uplink message (msg.3) to the network side on a resource specified in the RAR, the uplink message containing a UE ID; for example, msg.3 may be a radio resource control connection request (RRC connection request);

block 405: the network side receives the uplink message, and according to the UE identifier contained therein, feeds back a collision resolution message (msg. 4) to a UE succeeding in random access.

In an embodiment, when the random access is non-contention random access, before the block 401, the method may further include a block (not shown): transmitting indication information by the network side to the UE, the indication information being used to indicate a time-frequency position of a random access preamble sequence used in the random access procedure and a used access resource. Reference may be made to the related art, which shall not be described here any further.

In an embodiment, the UE initiates a random access procedure, which may be a contention-based random access procedure, or a non-contention-based random access procedure, and the embodiment is not limited thereto.

It can be seen from the above embodiment that the UE may receive the symbol identification information fed back by the network side, and differentiate random access responses transmitted in a random access response message according the symbol identification information, thereby solving the problem existed in the related art.

In an LTE system, a random access response message includes two data types, that is, random backoff time indication, and a normal random access response.

In a future wireless communication system, such as 5G or new radio (NR) system, a new data type is introduced into the random access response message, that is, acknowledgement of an on-demand system information request. Currently, a UE has no effective method to differentiate whether the received random access response message is the new data type, that is, the acknowledgement of an on-demand system information request.

To this end, this disclosure provides a random access method and apparatus and a communication system, in which via data type indication information contained in a random access response message, it may be explicitly indicated that the data type of the random access response message may be used to indicate the acknowledgement of an on-demand system information request, thereby solving the problems in the related art.

Furthermore, this disclosure provides a random access method and apparatus and a communication system, in which via RAPID contained in a random access response message, it may be implicitly indicated that the data type of the random access response message may be used to indicate the acknowledgement of an on-demand system information request, thereby solving the problems in the related art.

The above two methods shall be respectively described below with reference to the accompanying drawings.

Embodiment 4

Embodiment 4 of this disclosure provides a random access method, which is applicable to a network device side, such as being applicable to an apparatus making response to a random access procedure initiated by a UE.

FIG. 5 is a flowchart of the random access method of the embodiment of this disclosure. As shown in FIG. 5, the method includes:

block 501: a random access response message is transmitted to the UE, the random access response message including data type indication information, the data type indication information indicating a data format and/or a use of an MAC subheader or an MAC sub-data unit to which it corresponds; wherein, the data format includes a first data format which contains a preamble sequence identifier, but does not contain random access response data to which the preamble sequence identifier corresponds, and the use includes a first use indicating acknowledgement of an on-demand system information request.

In an embodiment, the random access response message may include a media access control layer (MAC) subheader and at least one MAC sub-data unit (sub PDU) to which the MAC subheader corresponds and padding information (optional); wherein, different MAC sub-data units correspond to different response results of random access preamble sequences transmitted by a UE, and the random access preamble sequence may be transmitted by the same UE, or may be transmitted by different UEs; and data formats or uses of different MAC sub-headers or their corresponding MAC sub-data units may be identical or different.

In an embodiment, the first use corresponds to the first data format, and when the use of the MAC sub-header or its corresponding MAC sub-data unit is the first use, that is, when it is used to indicate the acknowledgment of the on-demand system information request, the data format of the MAC sub-header or its corresponding MAC sub-data unit is the first data format, that is, the preamble sequence identifier is included but its corresponding random access response data is not included (i.e. only the RAPID is included). For example, the on-demand system information request may also be expressed as another system information request; for example, the other system information may be system information used for configuration of peer-to-peer communication; however, the embodiment is not limited thereto.

In an embodiment, the data format may further include a second data format of random backoff indication information, and/or a third data format at least containing a preamble sequence identifier and random access response data to which the preamble sequence identifier corresponds, and the use further includes a second use indicating a random backoff time, and/or a third use indicating a normal random access response.

For example, the second use corresponds to the second data format, and the use of the MAC sub-header or its corresponding MAC sub-data unit is the second use, that is, in being used to indicate a random backoff time, data format of the MAC sub-header or its corresponding the MAC sub-data unit is the second data format, that is, a backoff indicator (BI) is contained. The BI is used to indicate a waiting time range of the UE in retransmitting the random access preamble sequence, with it particular indication manner being identical to that in the related art.

For example, the third use corresponds to the third data format, and the use of the MAC sub-header or its corresponding MAC sub-data unit is the third use, that is, when it is used to indicate a normal random access response, the data format of the MAC sub-header or its corresponding MAC sub-data unit is the third data format, that is, at least the preamble identifier and its corresponding random access response data (i.e. RAPID+RAR) are included. The BI is used to indicate a waiting time range of the UE in retransmitting the random access preamble sequence, with it particular indication manner being identical to that in the related art.

In an embodiment, only three uses or data formats are exemplarily illustrated. However, the embodiment is not limited thereto, and the data type indication information may also be used to indicate other uses or data formats, for example, the data format is RAPID+SymbolID+RAR or RAPID+SymbolID.

In an embodiment, the data type indication information may be included in the MAC sub-header of the random access response message or the MAC sub-data unit to which the MAC sub-header corresponds, and the data type indication information may be a field of a predetermined number of bits. For example, the predetermined number may be determined according to the number of the data formats or uses of the data type.

For example, when currently supported uses of a MAC sub-header or an MAC sub-data unit to which the MAC sub-header corresponds has only two types, such as the first use and the second use, or the first use and the third use, the data type indication information is a field of 1 bit; wherein, the bit being 0 indicates the first use, and the bit being 1 indicates the second use or the third use, and vice versa.

For example, when currently supported uses of a MAC sub-header or the MAC sub-data unit to which the MAC sub-header corresponds has three types, for example, the first use, the second use, and the third use, the data type indication information is a field 2 bit; wherein, the bit being 00 indicates the first use, the bit being 01 indicates the second use, and the bit being 10 indicates the third use; however, the embodiment is not limited thereto.

For example, when currently supported data formats of a MAC sub-header or the MAC sub-data unit to which the MAC sub-header corresponds has only two types, for example, the first data format and the second data format, or the first data format and the third data format, the data type indication information is a field of 1 bit; wherein, the bit being 0 indicates the first data format, and the bit being 1 indicates the second data format or the third data format, and vice versa.

For example, when currently supported data formats of a MAC sub-header or the MAC sub-data unit to which the MAC sub-header corresponds has three types, for example, the first data format, the second data format and the third data format, the data type indication information is a field of 2 bits; wherein, the bit being 00 indicates the first data format, the bit being 01 indicates the second data format, and the bit being 10 indicates the third data format; however, the embodiment is not limited thereto.

In an embodiment, the data type indication information may be denoted by remaining bits, such as an extended field or an extended field+another field, in the MAC sub-header or the MAC sub-data unit to which the MAC sub-header corresponds; however, the embodiment is not limited thereto.

FIG. 6 and FIG. 7 are schematic diagrams of the formats of the random access response in an embodiment. As shown in FIG. 6, the data type indication information is a field of 2 bits; wherein, 00 indicates the first data format, and the 01 indicates the second data format, and 10 indicates the third data format; and as shown in FIG. 7, the data type indication information is a field of 1 bit; wherein, 0 indicates the first data format, and 1 indicates the third data format.

It can be seen from the above embodiment that by containing the data type indication information in the random access response message, the data types used to indicate the random access response message may be used to indicate the acknowledgement of the on-demand system information request, thereby solving the problems in the related art.

Embodiment 5

Embodiment 5 of this disclosure provides a random access method, which is applicable to a UE side, such as being applicable to an apparatus side initiating a random access procedure.

FIG. 8 is a flowchart of the random access method of the embodiment of this disclosure. As shown in FIG. 8, the method includes:

block 801: a random access response message is received, the random access response message containing data type indication information, the data type indication information indicating a data format and/or use of an MAC sub-data unit or an MAC sub-data unit to which it corresponds; wherein, the data format includes a first data format which contains a preamble sequence identifier, but does not contain random access response data to which the preamble sequence identifier corresponds, and the use includes a first use indicating acknowledgement of an on-demand system information request.

In an embodiment, reference may be made to Embodiment 4 for a format of the random access response message, and reference may also be made to Embodiment 4 for an implementation of the data type indication information, with repeated parts being not going to be described herein any further.

In an embodiment, after the UE successfully descrambles the PDCCH, the UE may receive the random access response message, sequentially read each MAC sub-header or its corresponding MAC sub-data unit in the random access response message, and determine the data format or use of the MAC sub-header or its corresponding MAC sub-data unit according to the data type indication information in the MAC sub-header or its corresponding MAC sub-data unit.

For example, when the UE reads that a use of a current MAC sub-header or its corresponding MAC sub-data unit is the first use, it determines that the MAC sub-header or its corresponding MAC sub-data unit is used to indicate acknowledgement of an on-demand system information request, its data format being the first data format and including only the RAPID. And according to the information, the UE may learn that an on-demand system information request previously initiated by it is acknowledged by the network side, and the acknowledgement of an on-demand system information request may be deemed as a response (ACK) message to the request.

For example, when the UE reads that the use of the current MAC sub-header or its corresponding MAC sub-data unit is the second use, it determines that the MAC sub-header or its corresponding MAC sub-data unit is used to indicate a random backoff time, its data format being the second data format and including a BI, the UE may save the BI, and when random access is needed subsequently, the UE may select a value from values between 0~BI and take it as a time for delaying transmission of the random access preamble sequence.

For example, when the UE reads that the use of the current MAC sub-header or its corresponding MAC sub-data unit is the third use, it determines that the MAC sub-header or its corresponding MAC sub-data unit is used for a normal random access response, its data format being the third data format and including RAPID+RAR, and according to the RAPID and other information, such as the symbol identification information in Embodiment 1, further determine whether the RAR is transmitted to the UE.

It can be seen from the above embodiment that by containing the data type indication information in the random access response message, the data types used to indicate the random access response message may be used to indicate the acknowledgement of the on-demand system information request, thereby solving the problems in the related art.

Embodiment 6

Embodiment 6 of this disclosure provides a random access method, which is applicable to a UE side, such as being applicable to an apparatus side initiating a random access procedure.

FIG. 9 is a flowchart of the random access method of the embodiment of this disclosure. As shown in FIG. 9, the method includes:

block 901: a random access response message is received; and block 902: when an MAC subheader or an MAC sub-data unit to which the MAC subheader corresponds in the random access response message contains a random access preamble sequence identifier and the random access preamble sequence identifier belongs to a preconfigured sequence identifier set of random access preamble sequences used for an on-demand system information request, it is determined that a use of the MAC subheader or the MAC sub-data unit to which the MAC subheader corresponds is to indicate acknowledgement of the on-demand system information request, or when an MAC subheader or an MAC sub-data unit to which the MAC subheader corresponds in the random access response message contains a random access preamble sequence identifier and the random access preamble sequence identifier does not belong to a preconfigured sequence identifier set of random access preamble sequences used for an on-demand system information request, it is determined that a use of the MAC subheader or the MAC sub-data unit to which the MAC subheader corresponds is to indicate a normal random access response.

In an embodiment, reference may be made to the related art for a format of the random access response message. FIG. 2 is a schematic diagram of a format of a random access response message in the related art. As shown in FIG. 2, the random access response message may include a media access control (MAC) layer sub-header and at least one MAC sub-data unit (sub PDU) to which the MAC sub-header corresponds and padding information (optional); wherein, different MAC sub-data units correspond to different response results of random access preamble sequences transmitted by a UE, and the random access preamble sequences may be transmitted by the same UE, or may be transmitted by different UEs. For example, when the network side acknowledges that the UE may perform random access, a random access response may be contained in the MAC sub-data unit, indicating acknowledgement of a random access request; wherein the MAC sub-data unit may further include a RAPID and other information, such as symbol identification information, or BI, which will not be exemplified herein any further.

Reference may be made to the related art for the method for receiving the random access response message in block 901. For example, the UE monitors the PDCCH, descrambles the PDCCH according to the RA-RNTI, and receives the random access response message, with details being not going to be described herein any further.

In block 902, the MAC sub-header or the MAC sub-data unit to which the MAC sub-header corresponds in the random access response message is sequentially read, and when the RAPID is included in the MAC sub-header or the MAC sub-data unit to which the MAC sub-header corresponds, the RAPID is compared with a sequence identifier in a sequence identifier set of the random access preamble sequence used for the on-demand system information request, and when an identifier with a sequence number RAPID is included in the set, a use of the MAC sub-header or the MAC sub-data unit to which the MAC sub-header corresponds is determined as being used for indicating the acknowledgement of the on-demand system information request; and the UE may learn that an on-demand system information request previously initiated by it is acknowledged by the network side, and the acknowledgement of an on-demand system information request may be deemed as a response (ACK) message to the request.

For example, when the identifier with a sequence number RAPID is not included in the set, the use of the MAC sub-header or the MAC sub-data unit to which the MAC sub-header corresponds is determined as being used for indicating a normal random access response, and furthermore, according to the RAPID and other information, such as the symbol identification information in Embodiment 1, whether the RAR included in the MAC sub-header or the MAC sub-data unit to which the MAC sub-header corresponds is transmitted to the UE is determined.

In an embodiment, before block 901, the method further includes (not shown): acquiring, by the UE, a preconfigured sequence identification set of the random access preamble sequence used for the on-demand system information request.

For example, the sequence identifier set of the random access preamble sequence used for the on-demand system information request may be preconfigured by the network side and then notified to the UE, or may be predefined by the network.

For example, the preconfigured sequence identification set of the random access preamble sequence used for the on-demand system information request is {0, 3, 6, 9, 12, 15}, and the UE sequentially reads the MAC sub-header or the MAC sub-data unit to which the MAC sub-header corresponds in the random access response message, and determines whether the RAPID is equal to one of 0, 3, 6, 9, 12, 15 when the RAPID is included; for example, when the RAPID=3, the use of the MAC sub-header or the MAC sub-data unit to which the MAC sub-header corresponds is determined as being used for indicating the acknowledgement of the on-demand system information request; for another example, when the RAPID=2, the use of the MAC sub-header or the MAC sub-data unit to which the MAC sub-header corresponds is determined as being used for normal random access response.

It can be seen from the above embodiment that the RAPID contained in the random access response message implicitly indicates that the data type of the random access response message may be used to indicate the acknowledgement of the on-demand system information request, thereby solving the problem in the related art, and saving bit information.

In the LTE system, an extension field (E) is provided in the MAC sub-PDU to which the MAC sub-header in the random access response message corresponds, which is used to indicate whether there exist other MAC sub-headers subsequent to the MAC sub-header, or whether there exist other MAC sub-PDUs subsequent to the sub-PDU.

In a future wireless communication systems, such as a 5G or new radio (NR) system, a new data type is introduced into the random access response message, that is, acknowledgment of an on-demand system information request, or when more indication information needs to be carried in a random access response message, the extension field may possibly be occupied to indicate a new data type or other information. Therefore, the extension field is unable to be used to indicate whether there exist other MAC sub-PDUs subsequent to the MAC sub-PDU, and when the UE reads the MAC sub-PDU after receiving the random access response message, it is unable to learn whether there exist other MAC sub-PDUs needing to be read after the MAC sub-PDU.

To this end, this disclosure provides a random access method and apparatus and a communication system, in which the MAC sub-header including the random backoff indication or its corresponding MAC sub-PDU is placed as the last one of all MAC sub-headers or their corresponding MAC sub-PDUs. When the UE reads the MAC sub-header containing the random backoff indication or its corresponding MAC sub-PDU, it acknowledges that there exists no MAC sub-header or its corresponding MAC sub-PDU subsequently, so that the read operation may be ended, thereby solving the problem in the related art.

The above method shall be described below with reference to the accompanying drawings.

Embodiment 7

Embodiment 7 of this disclosure provides a random access method, which is applicable to a network device side, such as being applicable to an apparatus making response to a random access procedure initiated by a UE.

FIG. 10 is a flowchart of the random access method of an embodiment. As shown in FIG. 10, the method includes:

block 1001: a random access response message is received; wherein, the random access response message contains a plurality of MAC subheaders or MAC sub-data units to which the MAC subheaders correspond; and wherein, a position of an MAC subheader or an MAC sub-data unit to which the MAC subheader corresponds containing a random backoff indication message is located at the last of all the MAC subheaders or MAC subdata units to which the MAC subheaders correspond.

In an embodiment, the random access response message may include a media access control (MAC) layer subheader, at least one MAC sub-data unit (sub-PDU) to which the MAC sub-header corresponds and padding information (optional); wherein, data formats of different MAC sub-headers or their corresponding MAC sub-data units may be identical or different. For example, the data format includes a first data format including the preamble identifier but not including its corresponding random access response data (RAPID only), a second data format at least including the preamble identifier and its corresponding random access response data (RAPID+RAR), and/or a third data format of the random backoff indication information (BI); however, the embodiment is not limited thereto.

For example, one random access response message may include one or more MAC sub-headers or MAC sub-data units to which they correspond of the first data format or the second data format, but one random access response message includes at most one MAC subheader or its corresponding MAC subdata unit of the third data format.

In an embodiment, in the random access response message, a position of the MAC sub-header or its corresponding MAC sub-data unit of the third data format is located at the last of all the MAC subheaders or MAC subdata units to which the MAC subheaders correspond, and according to the MAC sub-header or its corresponding MAC sub-data unit of the third data format, whether there exist other MAC sub-headers or their corresponding MAC sub-data unit subsequent to the MAC sub-header or its corresponding MAC sub-data unit of the third data format.

FIG. 11 is a schematic diagram of the format of the random access response message in an embodiment. As shown in FIG. 11, the MAC sub-PDU containing the BI is at the last of all the MAC sub-PDUs, and there is no other MAC sub-header or its corresponding MAC sub-PDU subsequent to it.

It can be seen from the above embodiment that when the UE reads the MAC sub-header including the random backoff indication or its corresponding MAC sub-PDU, it may acknowledge that there exists no MAC sub-header or its corresponding MAC sub-PDU subsequent to it, thereby solving the problems in the related art.

Embodiment 8

Embodiment 8 of this disclosure provides a random access method, which is applicable to a UE side, such as being applicable to a device side initiating a random access procedure.

Figure 12:
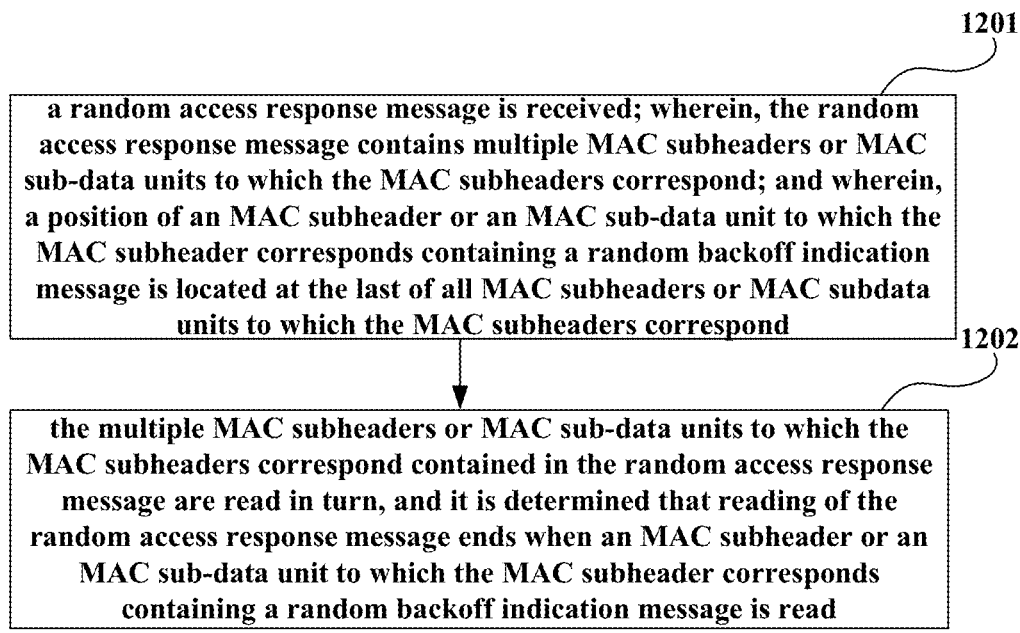
FIG. 12 is a flowchart of the random access method of Embodiment 8 of this disclosure.

FIG. 12 is a flowchart of the random access method of the embodiment of this disclosure. As shown in FIG. 12, the method includes:

block 1201: a random access response message is received; wherein, the random access response message contains a plurality of MAC subheaders or MAC sub-data units to which the MAC subheaders correspond; and wherein, a position of an MAC subheader or an MAC sub-data unit to which the MAC subheader corresponds containing a random backoff indication message is located at the last of all MAC subheaders or MAC subdata units to which the MAC subheaders correspond.

In an embodiment, reference may be made to Embodiment 7 for a format of the random access response message, which shall not be described herein any further.

For example, the method may further include:

block 1202: the plurality of MAC subheaders or MAC sub-data units to which the MAC subheaders correspond contained in the random access response message are read in turn, and it is determined that reading of the random access response message ends when an MAC subheader or an MAC sub-data unit to which the MAC subheader corresponds containing a random backoff indication message is read.

In an embodiment, the MAC sub-header or the MAC sub-data unit to which the MAC sub-head corresponds may include data type indication information used for indicating a data format of an MAC sub-header or its corresponding MAC sub-data unit, and reference may be made to Embodiment 4 for it particular implementation, which shall not be described herein any further.

In an embodiment, according to the data type indication information, the UE determines whether the data format of the MAC sub-header or its corresponding MAC sub-data unit is the first data format, or the second data format, or the third data format. It should be noted that the embodiment is not limited to the above three data formats.

For example, in determining that the data format of the MAC sub-header or its corresponding MAC sub-data unit is the first data format or the second data format according to the data type indication information, the UE further continues to read an MAC sub-header or an MAC sub-data unit to which MAC sub-header corresponds subsequent to the MAC sub-header or its corresponding MAC sub-data unit.

For example, in determining that the data format of the MAC sub-header or its corresponding MAC sub-data unit is the third data format according to the data type indication information, the UE determines that there exists no MAC sub-header or MAC sub-data unit to which MAC sub-header corresponds subsequent to the MAC sub-header or its corresponding MAC sub-data unit, that is, the reading of the random access response message ends.

It can be seen from the above embodiment that when the UE reads the MAC sub-header including the random backoff indication or its corresponding MAC sub-PDU, it may acknowledge that there exists no MAC sub-header or its corresponding MAC sub-PDU subsequent to it, so that the reading operation may be ended, thereby solving the problems in the related art.

Embodiment 9

Embodiment 9 of this disclosure provides an information transmission apparatus. As a principle of the apparatus for solving problems is similar to that of the method in Embodiment 1, reference may be made to the implementation of the method in Embodiment 1 for implementation of the apparatus, with identical contents being not going to be described herein any further.

Figure 13:
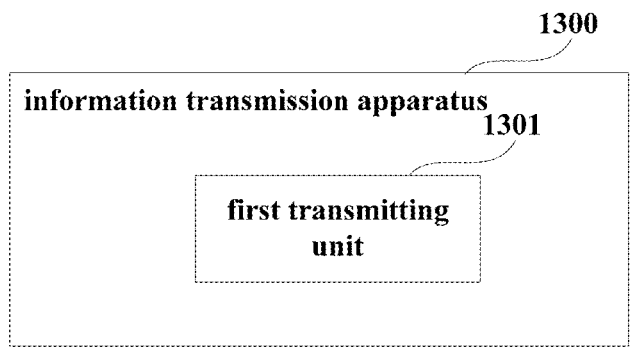
FIG. 13 is a schematic diagram of the information transmission apparatus of Embodiment 9 of this disclosure.

FIG. 13 is a schematic diagram of the information transmission apparatus of Embodiment 9 of this disclosure. As shown in FIG. 13, an information transmission apparatus 1300 includes:

a first transmitting unit 1301 configured to transmit symbol identification information to a UE, the symbol identification information indicating relevant information of a symbol used by a random access preamble sequence transmitted by the UE.

In an embodiment, reference may be made to block 101 in Embodiment 1 for implementation of the first transmitting unit 1301, which shall not be described herein any further.

In an embodiment, a meaning and carrying manner of the symbol identification information are as described in Embodiment 1. For example, the symbol identification information is transmitted via a random access response message. The symbol identification information is contained in a medium access control (MAC) subheader of the random access response message or in an MAC sub-data unit to which the MAC subheader corresponds. And wherein, the relevant information of the symbol is information on a position of a symbol occupied in a time domain by the random access preamble sequence transmitted by the UE. And wherein, the symbol identification information is a field of at least four bits.

It can be seen from the above embodiment that the UE may receive the symbol identification information fed back by the network side, and differentiate random access responses transmitted in a random access response message according the symbol identification information, thereby solving the problem existed in the related art.

Embodiment 10

Embodiment 10 of this disclosure provides a network device. As a principle of the network device for solving problems is similar to that of the method in Embodiment 1, reference may be made to the implementation of the method in Embodiment 1 for implementation of the network device, with identical contents being not going to be described herein any further.

An embodiment further provides a network device (not shown), configured with information transmission apparatus 1300 as described above.

Figure 14:
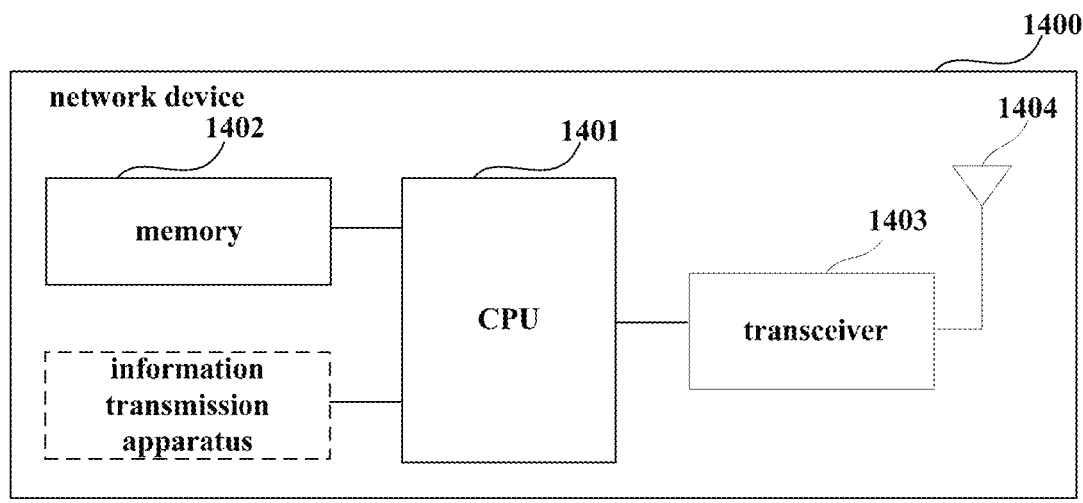
FIG. 14 is a schematic diagram of a structure of the network device of Embodiment 10 of this disclosure.

Embodiment 10 further provides a network device. As a principle of the device for solving problems is similar to that of the method in Embodiment 1, reference may be made to the implementation of the method in Embodiment 1 for implementation of the network device, with identical contents being not going to be described herein any further. FIG. 14 is a schematic diagram of a structure of the network device. As shown in FIG. 14, a network device 1400 may include a central processing unit (CPU) 1401 and a memory 1402, the memory 1402 being coupled to the central processing unit 1401. For example, the memory 1402 may store various data, and furthermore, it may store a program for data processing, and execute the program under control of the central processing unit, so as to transmit related information.

In one implementation, the functions of the apparatus 1300 may be integrated into the central processing unit 1401. For example, the central processing unit 1401 may be configured to carry out the information transmission method as described in Embodiment 1.

For example, the central processing unit 1401 may be configured to: transmit symbol identification information to a UE, the symbol identification information indicating relevant information of a symbol used by a random access preamble sequence transmitted by the UE.

In an embodiment, a meaning and carrying manner of the symbol identification information are as described in Embodiment 1. For example, the symbol identification information is transmitted via a random access response message. The symbol identification information is contained in a medium access control (MAC) subheader of the random access response message or in an MAC sub-data unit to which the MAC subheader corresponds. And wherein, the relevant information of the symbol is information on a position of a symbol occupied in a time domain by the random access preamble sequence transmitted by the UE. And wherein, the symbol identification information is a field of at least four bits.

And furthermore, reference may be made to Embodiment 1 for a particular configuration manner of the central processing unit 1401, which shall not be described herein any further.

In another implementation, the apparatus 1300 and the central processing unit 1401 may be configured separately. For example, the apparatus 1300 may be configured as a chip connected to the central processing unit 1401, with its functions being realized under control of the central processing unit 1401.

As shown in FIG. 14, the network device 1400 may further include a transceiver 1403, and an antenna 1404, etc. For example, functions of the above components are similar to those in the related art, and shall not be described herein any further. It should be noted that the network device 1400 does not necessarily include all the parts shown in FIG. 14, and furthermore, the network device 1400 may include parts not shown in FIG. 14, and the related art may be referred to.

It can be seen from the above embodiment that the UE may receive the symbol identification information fed back by the network side, and differentiate random access responses transmitted in a random access response message according the symbol identification information, thereby solving the problem existed in the related art.

Embodiment 11

Embodiment 11 of this disclosure provides an information transmission apparatus. As a principle of the apparatus for solving problems is similar to that of the method in Embodiment 2, reference may be made to the implementation of the method in Embodiment 2 for implementation of the apparatus, with identical contents being not going to be described herein any further.

Figure 15:
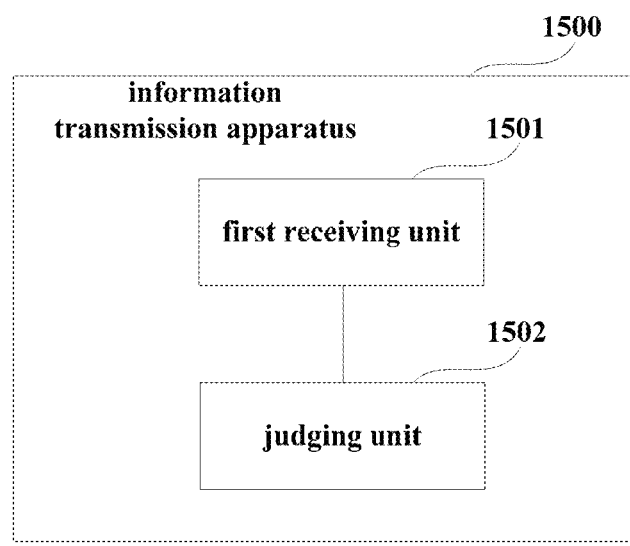
FIG. 15 is a schematic diagram of the information transmission apparatus of Embodiment 11 of this disclosure.

FIG. 15 is a schematic diagram of the information transmission apparatus of Embodiment 11 of this disclosure. As shown in FIG. 15, an information transmission apparatus 1500 includes:

a first receiving unit 1501 configured to receive symbol identification information transmitted by a network side, the symbol identification information indicating relevant information of a symbol used by a UE in transmitting a random access preamble sequence.

In an embodiment, reference may be made to block 301 in Embodiment 2 for implementation of the first receiving unit 1501, which shall not be described herein any further. And reference may be made to Embodiment 1 for a particular meaning of the symbol identification information, which shall not be described herein any further.

In an embodiment, the first receiving unit 1501 reads the random access response message transmitted by the network side, to receive the symbol identification information, and the apparatus further includes:

a judging unit 1502 configured to judge whether random access response data contained in the random access response message transmitted by the network side are successfully received by using the symbol identification information.

For example, the relevant information of the symbol is information on a position of the symbol occupied in a time domain by the random access preamble sequence transmitted by the UE.

Figure 16:
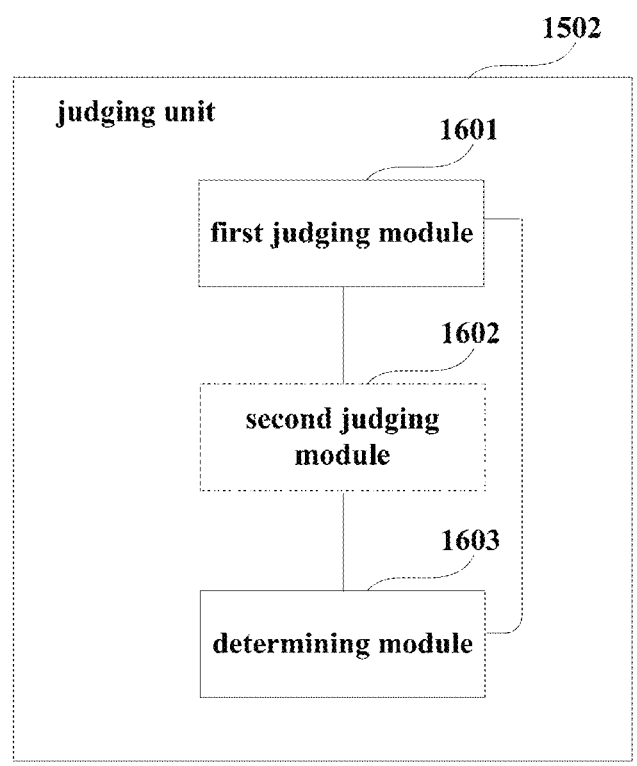
FIG. 16 is a schematic diagram of the judging unit of Embodiment 11 of this disclosure.

FIG. 16 is a schematic diagram of an implementation of the judging unit 1502. As shown in FIG. 16, the judging unit includes:

a first judging module 1601 configured to judge whether the position of the symbol indicated by the symbol identification information is in consistence with the position of the symbol occupied in a time domain by the random access preamble sequence transmitted by the UE; and/or, a second judging module 1602 configured to judge whether a random access preamble sequence identifier contained in the random access response message is in consistence with a random access preamble sequence identifier transmitted by the UE. For example, the judging unit 1502 may further include:

a determining module 1603 configured to determine that the random access response data contained in the random access response message are successfully received when a judgment result of the first judging module is yes, or determine that the random access response data contained in the random access response message are successfully received when a judgment result of the first judging module is yes and a judgment result of the second judging module is yes.

In an embodiment, reference may be made to block 302 in Embodiment 2 for implementation of the judging unit 1502, which shall not be described herein any further.

It can be seen from the above embodiment that the UE may receive the symbol identification information fed back by the network side, and differentiate random access responses transmitted in a random access response message according the symbol identification information, thereby solving the problem existed in the related art.

Embodiment 12

An embodiment provides a UE. As a principle of the UE for solving problems is similar to that of the method in Embodiment 2, reference may be made to the implementation of the method in Embodiment 2 for implementation of the UE, with identical contents being not going to be described herein any further.

An embodiment further provides a UE (not shown), configured with the information transmission apparatus 1500 as described above.

Figure 17:
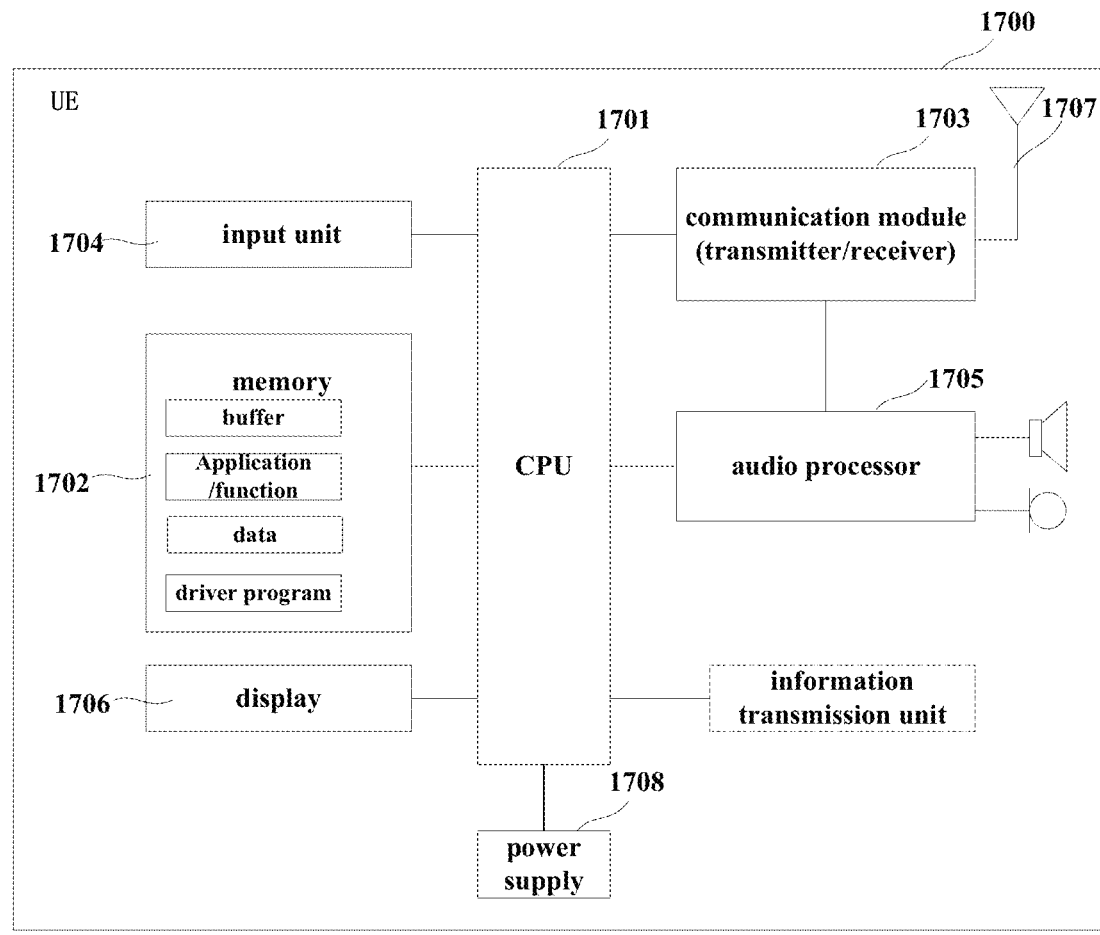
FIG. 17 is a schematic diagram of a structure of the UE of Embodiment 12 of this disclosure.

An embodiment further provides a UE. FIG. 17 is a schematic diagram of a structure of the UE of Embodiment 12 of this disclosure. As shown in FIG. 17, a UE 1700 may include a central processing unit (CPU) 1701 and a memory 1702, the memory 1702 being coupled to the central processing unit 1701. For example, the memory 1702 may store various data, and furthermore, it may store a program for data processing, and execute the program under control of the central processing unit 1701, so as to perform information transmission.

In one implementation, the functions of the apparatus 1500 may be integrated into the central processing unit 1701. For example, the central processing unit 1701 may be configured to carry out the information transmission method as described in Embodiment 2.

For example, the central processing unit 1701 may be configured to: receive symbol identification information transmitted by a network side, the symbol identification information indicating relevant information of a symbol used by a UE in transmitting a random access preamble sequence.

For example, the central processing unit 1701 may be configured to: read the random access response message transmitted by the network side, to receive the symbol identification information; and judge whether random access response data contained in the random access response message transmitted by the network side are successfully received by using the symbol identification information.

For example, the relevant information of the symbol is information on a position of the symbol occupied in a time domain by the random access preamble sequence transmitted by the UE.

For example, the central processing unit 1701 may be configured to: judge whether the position of the symbol indicated by the symbol identification information is in consistence with the position of the symbol occupied in a time domain by the random access preamble sequence transmitted by the UE; or, judge whether the position of the symbol indicated by the symbol identification information is in consistence with the position of the symbol occupied in a time domain by the random access preamble sequence transmitted by the UE and judge whether a random access preamble sequence identifier contained in the random access response message is in consistence with a random access preamble sequence identifier transmitted by the UE. For example, the central processing unit 1701 may be configured to: determine that the random access response data contained in the random access response message are successfully received when a judgment result is yes.

Furthermore, reference may be made to Embodiment 2 for other configurations of the central processing unit 1701, which shall not be described herein any further.

In another implementation, the apparatus 1500 and the central processing unit 1701 may be configured separately. For example, the apparatus 1500 may be configured as a chip connected to the central processing unit 1701, such as the information transmission unit shown in FIG. 17, with its functions being realized under control of the central processing unit 1701.

As shown in FIG. 17, the UE 1700 may further include a communication module 1703, an input unit 1704, a display 1706, an audio processor 1705, an antenna 1707, and a power supply 1708, etc. For example, functions of the above components are similar to those in the related art, and shall not be described herein any further. It should be noted that the UE 1700 does not necessarily include all the parts shown in FIG. 17, and furthermore, the UE 1700 may include parts not shown in FIG. 17, and the related art may be referred to.

It can be seen from the above embodiment that the UE may receive the symbol identification information fed back by the network side, and differentiate random access responses transmitted in a random access response message according the symbol identification information, thereby solving the problem existed in the related art.

Embodiment 13

Embodiment 13 provides a random access apparatus. As a principle of the apparatus for solving problems is similar to that of the method in Embodiment 4, reference may be made to the implementation of the method in Embodiment 4 for implementation of the apparatus, with identical contents being not going to be described herein any further.

Figure 18:
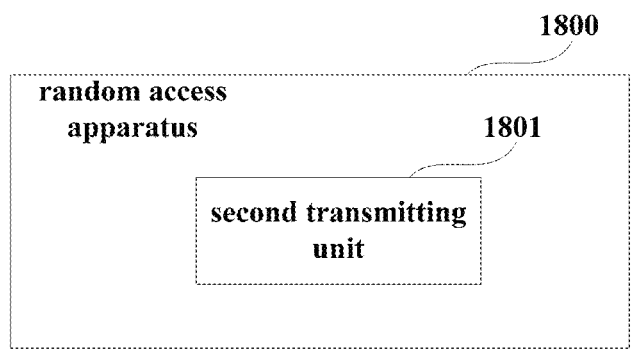
FIG. 18 is a schematic diagram of the random access apparatus of Embodiment 13 of this disclosure.

FIG. 18 is a schematic diagram of the random access apparatus of Embodiment 13 of this disclosure. As shown in FIG. 18, a random access apparatus 1800 includes:

a second transmitting unit 1801 configured to transmit a random access response message to a UE, the random access response message including data type indication information, the data type indication information indicating a data format and/or a use of an MAC subheader or an MAC sub-data unit; wherein, the data format includes a first data format which contains a preamble sequence identifier, but does not contain random access response data to which the preamble sequence identifier corresponds, and the use includes a first use indicating acknowledgement of an on-demand system information request.

In an embodiment, reference may be made to block 501 in Embodiment 4 for implementation of the second transmitting unit 1801, which shall not be described herein any further.

In an embodiment, reference may be made to Embodiment 4 for a meaning of the data type indication information, which shall not be described herein any further.

For example, the data type indication information is contained in an MAC subheader of the random access response message or in an MAC sub-data unit to which the MAC subheader corresponds.

For example, the data format further includes a second data format of random backoff indication information, and/or a third data format at least containing a preamble sequence identifier and random access response data to which the preamble sequence identifier corresponds. And the use further includes a second use indicating a random backoff time, and/or a third use indicating a normal random access response.

For example, the data type indication information is a field of one or two bits.

It can be seen from the above embodiment that by containing the data type indication information in the random access response message, the data types used to indicate the random access response message may be used to indicate the acknowledgement of the on-demand system information request, thereby solving the problems in the related art.

Embodiment 14

Embodiment 14 provides a network device. As a principle of the device for solving problems is similar to that of the method in Embodiment 4, reference may be made to the implementation of the method in Embodiment 4 for implementation of the device, with identical contents being not going to be described herein any further.

An embodiment further provides a network device (not shown), configured with random access apparatus 1800 as described above.

Figure 19:
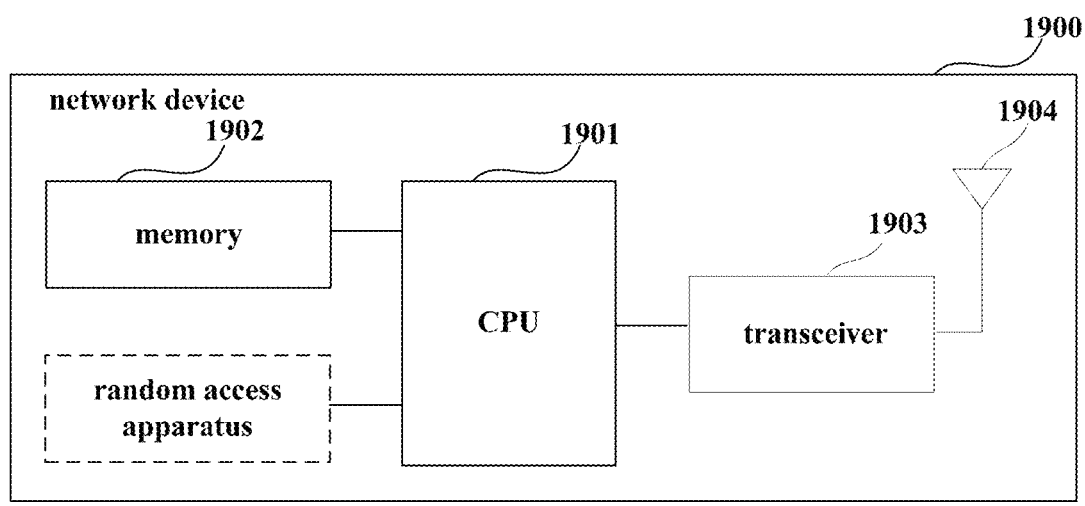
FIG. 19 is a schematic diagram of a structure of a network device of Embodiment 14 of this disclosure.

Embodiment 14 further provides a network device. As a principle of the device for solving problems is similar to that of the method in Embodiment 4, reference may be made to the implementation of the method in Embodiment 1 for implementation of the network device, with identical contents being not going to be described herein any further. FIG. 19 is a schematic diagram of a structure of the network device. As shown in FIG. 19, a network device 1900 may include a central processing unit (CPU) 1901 and a memory 1902, the memory 1902 being coupled to the central processing unit 1901. For example, the memory 1902 may store various data, and furthermore, it may store a program for data processing, and execute the program under control of the central processing unit 1901, so as to transmit related information.

In one implementation, the functions of the apparatus 1800 may be integrated into the central processing unit 1901. For example, the central processing unit 1901 may be configured to carry out the random access method as described in Embodiment 4.

For example, the central processing unit 1901 may be configured to: transmit a random access response message to a UE, the random access response message including data type indication information, the data type indication information indicating a data format and/or a use of an MAC subheader or an MAC sub-data unit; wherein, the data format includes a first data format which contains a preamble sequence identifier, but does not contain random access response data to which the preamble sequence identifier corresponds, and the use includes a first use indicating acknowledgement of an on-demand system information request.

In an embodiment, reference may be made to Embodiment 4 for a meaning of the data type indication information, which shall not be described herein any further.

For example, the data type indication information is contained in an MAC subheader of the random access response message or in an MAC sub-data unit to which the MAC subheader corresponds.

For example, the data format further includes a second data format of random backoff indication information, and/or a third data format at least containing a preamble sequence identifier and random access response data to which the preamble sequence identifier corresponds. And the use further includes a second use indicating a random backoff time, and/or a third use indicating a normal random access response.

For example, the data type indication information is a field of one or two bits.

And furthermore, reference may be made to Embodiment 4 for a particular configuration manner of the central processing unit 1901, which shall not be described herein any further.

In another implementation, the apparatus 1800 and the central processing unit 1901 may be configured separately. For example, the apparatus 1800 may be configured as a chip connected to the central processing unit 1901, such as a unit shown in FIG. 19, with its functions being realized under control of the central processing unit 1901.

As shown in FIG. 19, the network device 1900 may further include a transceiver 1903, and an antenna 1904, etc. For example, functions of the above components are similar to those in the related art, and shall not be described herein any further. It should be noted that the network device 1900 does not necessarily include all the parts shown in FIG. 19, and furthermore, the network device 1900 may include parts not shown in FIG. 19, and the related art may be referred to.

It can be seen from the above embodiment that by containing the data type indication information in the random access response message, the data types used to indicate the random access response message may be used to indicate the acknowledgement of the on-demand system information request, thereby solving the problems in the related art.

Embodiment 15

Embodiment 15 provides a random access apparatus. As a principle of the apparatus for solving problems is similar to that of the method in Embodiment 5, reference may be made to the implementation of the method in Embodiment 5 for implementation of the apparatus, with identical contents being not going to be described herein any further.

Figure 20:
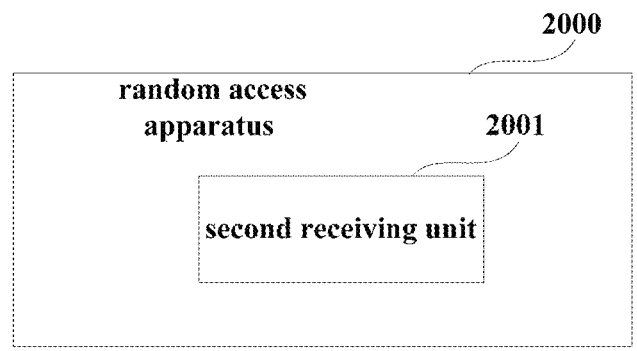
FIG. 20 is a schematic diagram of the random access apparatus of Embodiment 15 of this disclosure.

FIG. 20 is a schematic diagram of the random access apparatus of Embodiment 15 of this disclosure. As shown in FIG. 20, a random access apparatus 2000 includes:

a second receiving unit 2001 configured to receive a random access response message, the random access response message including data type indication information, the data type indication information indicating a data format and/or use of an MAC sub-data unit; wherein, the data format includes a first data format which contains a preamble sequence identifier, but does not contain random access response data to which the preamble sequence identifier corresponds, and the use includes a first use indicating acknowledgement of an on-demand system information request.

For example, reference may be made to block 801 in Embodiment 5 for implementation of the second receiving unit 2001, which shall not be described herein any further.

For example, the data type indication information is contained in an MAC subheader of the random access response message or in an MAC sub-data unit to which the MAC subheader corresponds.

For example, the data format further includes a second data format of random backoff indication information, and/or a third data format at least containing a preamble sequence identifier and random access response data to which the preamble sequence identifier corresponds. And the use further includes a second use indicating a random backoff time, and/or a third use indicating a normal random access response.

For example, the data type indication information is a field of one or two bits.

It can be seen from the above embodiment that by containing the data type indication information in the random access response message, the data types used to indicate the random access response message may be used to indicate the acknowledgement of the on-demand system information request, thereby solving the problems in the related art.

Embodiment 16

An embodiment provides a UE. As a principle of the UE for solving problems is similar to that of the method in Embodiment 5, reference may be made to the implementation of the method in Embodiment 5 for implementation of the UE, with identical contents being not going to be described herein any further.

An embodiment further provides a UE (not shown), configured with the random access apparatus 2000 as described above.

Figure 21:
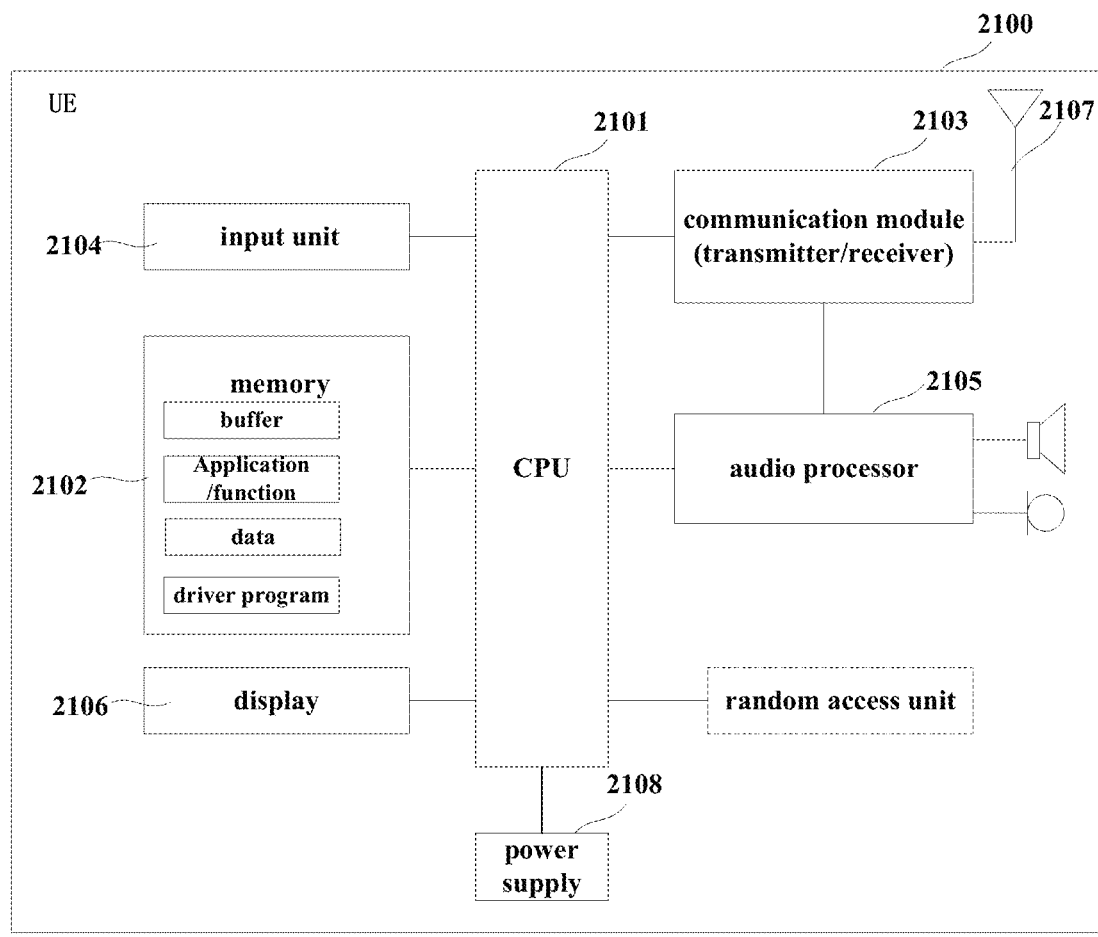
FIG. 21 is a schematic diagram of a structure of the UE of Embodiment 16 of this disclosure.

An embodiment further provides a UE. FIG. 21 is a schematic diagram of a structure of the UE of Embodiment 16 of this disclosure. As shown in FIG. 21, a UE 2100 may include a central processing unit (CPU) 2101 and a memory 2102, the memory 2102 being coupled to the central processing unit 2101. For example, the memory 2102 may store various data, and furthermore, it may store a program for data processing, and execute the program under control of the central processing unit 2101, so as to perform random access.

In one implementation, the functions of the apparatus 2000 may be integrated into the central processing unit 2101. For example, the central processing unit 2101 may be configured to carry out the random access method as described in Embodiment 5.

For example, the central processing unit 2101 may be configured to: receive a random access response message, the random access response message including data type indication information, the data type indication information indicating a data format and/or use of an MAC sub-data unit; wherein, the data format includes a first data format which contains a preamble sequence identifier, but does not contain random access response data to which the preamble sequence identifier corresponds, and the use includes a first use indicating acknowledgement of an on-demand system information request.

For example, the data type indication information is contained in an MAC subheader of the random access response message or in an MAC sub-data unit to which the MAC subheader corresponds.

For example, the data format further includes a second data format of random backoff indication information, and/or a third data format at least containing a preamble sequence identifier and random access response data to which the preamble sequence identifier corresponds. And the use further includes a second use indicating a random backoff time, and/or a third use indicating a normal random access response.

For example, the data type indication information is a field of one or two bits.

And furthermore, reference may be made to Embodiment 5 for other configuration manners of the central processing unit 2101, which shall not be described herein any further.

In another implementation, the above apparatus 2000 and the central processing unit 2101 may be configured separately. For example, the apparatus 2000 may be configured as a chip connected to the central processing unit 2101, such as the random access unit shown in FIG. 21, with its functions being realized under control of the central processing unit 2101.

As shown in FIG. 21, the UE 2100 may further include a communication module 2103, an input unit 2104, a display 2106, an audio processor 2105, an antenna 2107, and a power supply 2108, etc. For example, functions of the above components are similar to those in the related art, and shall not be described herein any further. It should be noted that the UE 2100 does not necessarily include all the parts shown in FIG. 21, and furthermore, the UE 2100 may include parts not shown in FIG. 21, and the related art may be referred to.

It can be seen from the above embodiment that by containing the data type indication information in the random access response message, the data types used to indicate the random access response message may be used to indicate the acknowledgement of the on-demand system information request, thereby solving the problems in the related art.

Embodiment 17

Embodiment 17 provides a random access apparatus. As a principle of the apparatus for solving problems is similar to that of the method in Embodiment 6, reference may be made to the implementation of the method in Embodiment 6 for implementation of the apparatus, with identical contents being not going to be described herein any further.

Figure 22:
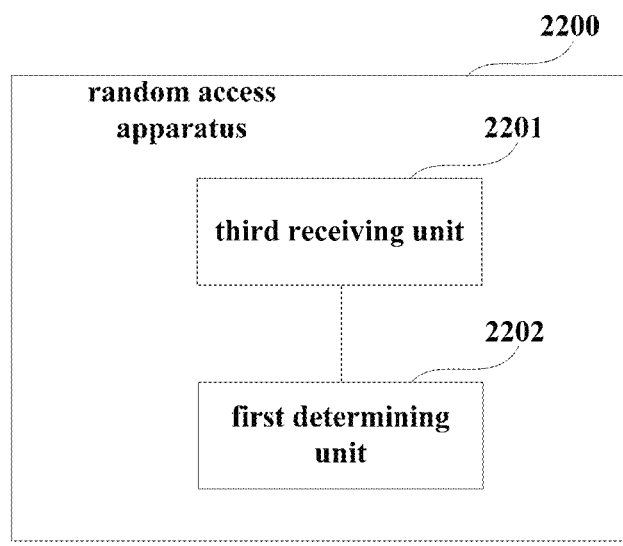
FIG. 22 is a schematic diagram of the random access apparatus of Embodiment 17 of this disclosure.

FIG. 22 is a schematic diagram of the random access apparatus of Embodiment 17 of this disclosure. As shown in FIG. 22, a random access apparatus 2200 includes:

a third receiving unit 2201 configured to receive a random access response message; and a first determining unit 2202 configured to, when an MAC subheader or an MAC sub-data unit to which the MAC subheader corresponds in the random access response message contains a random access preamble sequence identifier and the random access preamble sequence identifier belongs to a preconfigured sequence identifier set of random access preamble sequences used for an on-demand system information request, determine that a use of the MAC subheader or the MAC sub-data unit to which the MAC subheader corresponds is to indicate acknowledgement of the on-demand system information request, or when an MAC subheader or an MAC sub-data unit to which the MAC subheader corresponds in the random access response message contains a random access preamble sequence identifier and the random access preamble sequence identifier does not belong to a preconfigured sequence identifier set of random access preamble sequences used for an on-demand system information request, determine that a use of the MAC subheader or the MAC sub-data unit to which the MAC subheader corresponds is to indicate a normal random access response.

In an embodiment, reference may be made to blocks 901-902 in Embodiment 6 for implementation of the third receiving unit 2201 and the first determining unit 2202, which shall not be described herein any further.

It can be seen from the above embodiment that via RAPID contained in a random access response message, it may be implicitly indicated that the data type of the random access response message may be used to indicate the acknowledgement of an on-demand system information request, thereby solving the problems in the related art, and saving bit information.

Embodiment 18

An embodiment provides a UE. As a principle of the UE for solving problems is similar to that of the method in Embodiment 6, reference may be made to the implementation of the method in Embodiment 6 for implementation of the UE, with identical contents being not going to be described herein any further.

An embodiment further provides a UE (not shown), configured with the random access apparatus 2200 as described above.

Figure 23:
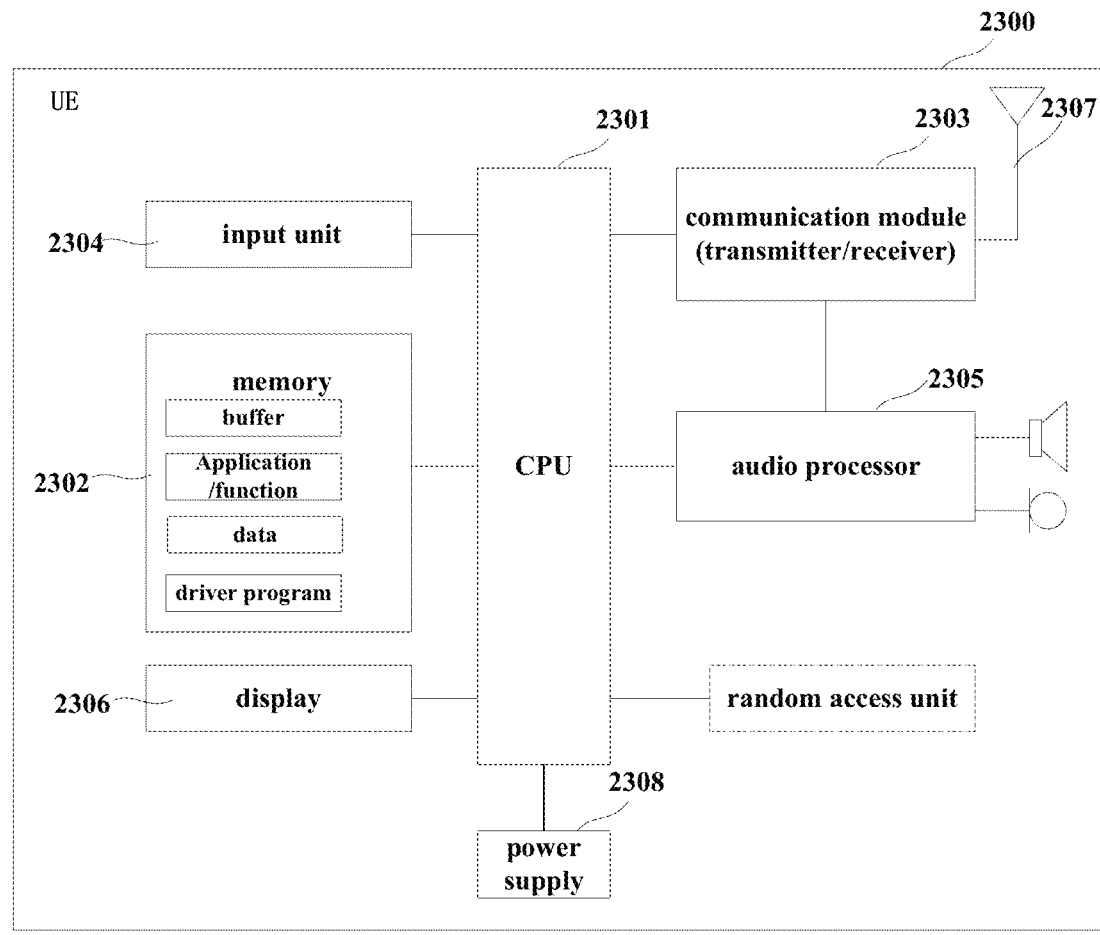
FIG. 23 is a schematic diagram of a structure of the UE of Embodiment 18 of this disclosure.

An embodiment further provides a UE. FIG. 23 is a schematic diagram of a structure of the UE of Embodiment 18 of this disclosure. As shown in FIG. 23, a UE 2300 may include a central processing unit (CPU) 2301 and a memory 2302, the memory 2302 being coupled to the central processing unit 2301. For example, the memory 2302 may store various data, and furthermore, it may store a program for data processing, and execute the program under control of the central processing unit 2301, so as to perform random access.

In one implementation, the functions of the apparatus 2200 may be integrated into the central processing unit 2301. For example, the central processing unit 2301 may be configured to carry out the random access method as described in Embodiment 6.

For example, the central processing unit 2301 may be configured to: receive a random access response message; and when an MAC subheader or an MAC sub-data unit to which the MAC subheader corresponds in the random access response message contains a random access preamble sequence identifier and the random access preamble sequence identifier belongs to a preconfigured sequence identifier set of random access preamble sequences used for an on-demand system information request, determine that a use of the MAC subheader or the MAC sub-data unit to which the MAC subheader corresponds is to indicate acknowledgement of the on-demand system information request, or when an MAC subheader or an MAC sub-data unit to which the MAC subheader corresponds in the random access response message contains a random access preamble sequence identifier and the random access preamble sequence identifier does not belong to a preconfigured sequence identifier set of random access preamble sequences used for an on-demand system information request, determine that a use of the MAC subheader or the MAC sub-data unit to which the MAC subheader corresponds is to indicate a normal random access response.

And furthermore, reference may be made to Embodiment 6 for other configuration manners of the central processing unit 2301, which shall not be described herein any further.

In another implementation, the above apparatus 2200 and the central processing unit 2301 may be configured separately. For example, the apparatus 2200 may be configured as a chip connected to the central processing unit 2301, such as the random access unit shown in FIG. 23, with its functions being realized under control of the central processing unit 2301.

As shown in FIG. 23, the UE 2300 may further include a communication module 2303, an input unit 2304, a display 2306, an audio processor 2305, an antenna 2307, and a power supply 2308, etc. For example, functions of the above components are similar to those in the related art, and shall not be described herein any further. It should be noted that the UE 2300 does not necessarily include all the parts shown in FIG. 23, and furthermore, the UE 2300 may include parts not shown in FIG. 23, and the related art may be referred to.

It can be seen from the above embodiment that via RAPID contained in a random access response message, it may be implicitly indicated that the data type of the random access response message may be used to indicate the acknowledgement of an on-demand system information request, thereby solving the problems in the related art, and saving bit information.

Embodiment 19

Embodiment 19 provides a random access apparatus. As a principle of the apparatus for solving problems is similar to that of the method in Embodiment 7, reference may be made to the implementation of the method in Embodiment 7 for implementation of the apparatus, with identical contents being not going to be described herein any further.

Figure 24:
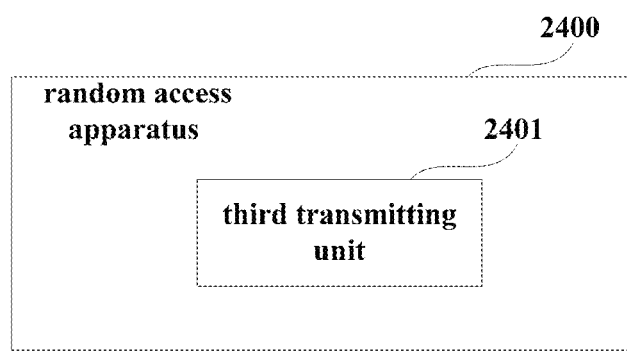
FIG. 24 is a schematic diagram of the random access apparatus of Embodiment 19 of this disclosure.

FIG. 24 is a schematic diagram of the random access apparatus of Embodiment 19 of this disclosure. As shown in FIG. 24, a random access apparatus 2400 includes:

a third transmitting unit 2401 configured to transmit a random access response message; wherein, the random access response message contains a plurality of MAC subheaders or MAC sub-data units to which the MAC subheaders correspond; and wherein, a position of an MAC subheader or an MAC sub-data unit to which the MAC subheader corresponds containing a random backoff indication message is located at the last of all the MAC subheaders or MAC sub-data units to which the MAC subheaders correspond.

In an embodiment, reference may be made to Embodiment 7 for a format of the random access response message.

In an embodiment, reference may be made to block 1001 in Embodiment 7 for implementation of the third transmitting unit 2401, which shall not be described herein any further.

It can be seen from the above embodiment that when the UE reads the MAC sub-header containing the random backoff indication or its corresponding MAC sub-PDU, it acknowledges that there exists no MAC sub-header or its corresponding MAC sub-PDU subsequently, so that the read operation may be ended, thereby solving the problem in the related art.

Embodiment 20

Embodiment 20 provides a network device. As a principle of the device for solving problems is similar to that of the method in Embodiment 7, reference may be made to the implementation of the method in Embodiment 7 for implementation of the device, with identical contents being not going to be described herein any further.

An embodiment further provides a network device (not shown), configured with random access apparatus 2400 as described above.

Figure 25:
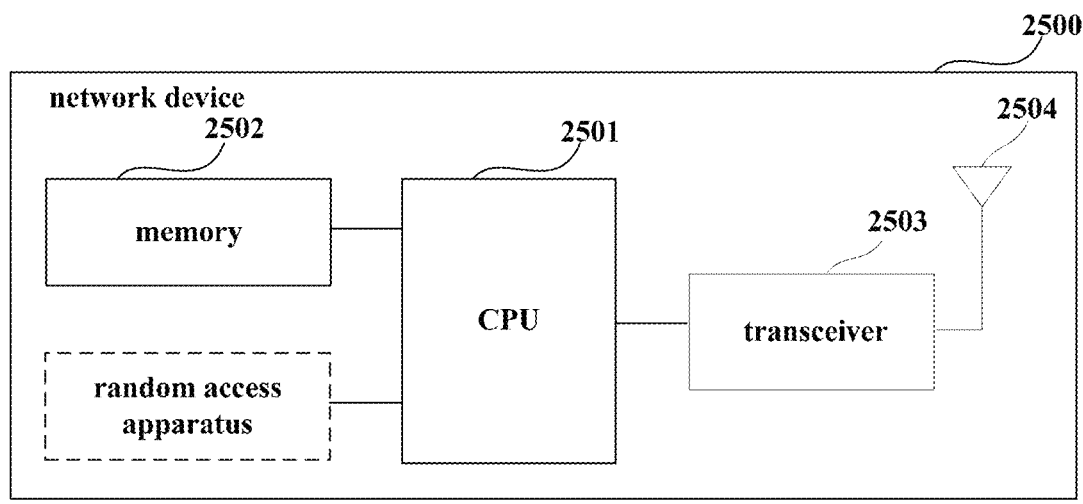
FIG. 25 is a schematic diagram of a structure of the network device of Embodiment 20 of this disclosure.

Embodiment 20 further provides a network device. FIG. 25 is a schematic diagram of a structure of the network device of Embodiment 20 of this disclosure. As shown in FIG. 25, a network device 2500 may include a central processing unit (CPU) 2501 and a memory 2502, the memory 2502 being coupled to the central processing unit 2501. For example, the memory 2502 may store various data, and furthermore, it may store a program for data processing, and execute the program under control of the central processing unit 2501, so as to transmit related information.

In one implementation, the functions of the apparatus 2400 may be integrated into the central processing unit 2501. For example, the central processing unit 2501 may be configured to carry out the random access method as described in Embodiment 7.

For example, the central processing unit 2501 may be configured to: transmit a random access response message; wherein, the random access response message contains a plurality of MAC subheaders or MAC sub-data units to which the MAC subheaders correspond; and wherein, a position of an MAC subheader or an MAC sub-data unit to which the MAC subheader corresponds containing a random backoff indication message is located at the last of all the MAC subheaders or MAC sub-data units to which the MAC subheaders correspond.

In an embodiment, reference may be made to Embodiment 7 for a format of the random access response message.

And furthermore, reference may be made to Embodiment 7 for a particular configuration manner of the central processing unit 2501, which shall not be described herein any further.

In another implementation, the apparatus 2400 and the central processing unit 2501 may be configured separately. For example, the apparatus 2400 may be configured as a chip connected to the central processing unit 2501, such as a unit shown in FIG. 25, with its functions being realized under control of the central processing unit 2501.

Furthermore, as shown in FIG. 25, the network device 2500 may include a transceiver 2503, and an antenna 2504, etc. For example, functions of the above components are similar to those in the related art, and shall not be described herein any further. It should be noted that the network device 2500 does not necessarily include all the parts shown in FIG. 25, and furthermore, the network device 2500 may include parts not shown in FIG. 25, and the related art may be referred to.

It can be seen from the above embodiment that when the UE reads the MAC sub-header containing the random backoff indication or its corresponding MAC sub-PDU, it acknowledges that there exists no MAC sub-header or its corresponding MAC sub-PDU subsequently, so that the read operation may be ended, thereby solving the problem in the related art.

Embodiment 21

Embodiment 21 provides a random access apparatus. As a principle of the apparatus for solving problems is similar to that of the method in Embodiment 8, reference may be made to the implementation of the method in Embodiment 8 for implementation of the apparatus, with identical contents being not going to be described herein any further.

Figure 26:
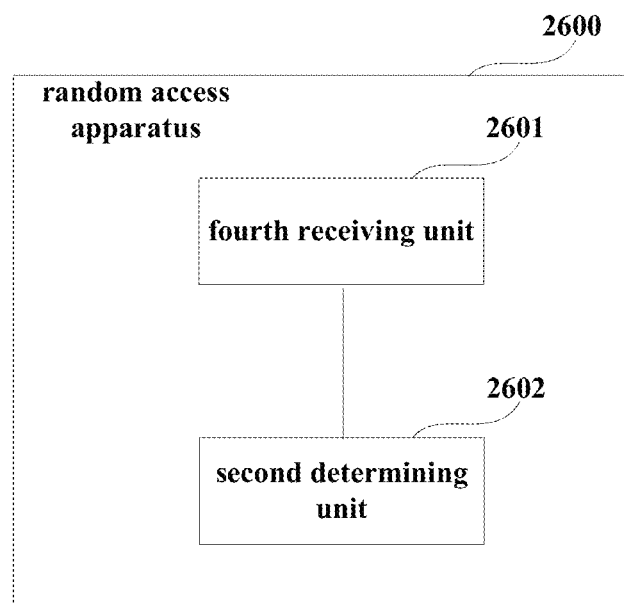
FIG. 26 is a schematic diagram of the random access apparatus of Embodiment 21 of this disclosure.

FIG. 26 is a schematic diagram of the random access apparatus of Embodiment 21 of this disclosure. As shown in FIG. 26, a random access apparatus 2600 includes:

a fourth receiving unit 2601 configured to receive a random access response message; wherein, the random access response message contains a plurality of MAC subheaders or MAC sub-data units to which the MAC subheaders correspond; and wherein, a position of an MAC subheader or an MAC sub-data unit to which the MAC subheader corresponds containing a random backoff indication message is located at the last of all the MAC subheaders or MAC subdata units to which the MAC subheaders correspond.

In an embodiment, reference may be made to Embodiment 7 for a format of the random access response message.

In an embodiment, the apparatus may further include:

a second determining unit 2602 configured to read in turn the plurality of MAC subheaders or MAC sub-data units to which the MAC subheaders correspond contained in the random access response message, and determine that reading of the random access response message ends when an MAC subheader or an MAC sub-data unit to which the MAC subheader corresponds containing a random backoff indication message is read.

In an embodiment, reference may be made to blocks 1201-1202 in Embodiment 8 for implementation of the fourth receiving unit 2601 and the second determining unit 2602, which shall not be described herein any further.

It can be seen from the above embodiment that when the UE reads the MAC sub-header containing the random backoff indication or its corresponding MAC sub-PDU, it acknowledges that there exists no MAC sub-header or its corresponding MAC sub-PDU subsequently, so that the read operation may be ended, thereby solving the problem in the related art.

Embodiment 22

An embodiment provides a UE. As a principle of the UE for solving problems is similar to that of the method in Embodiment 8, reference may be made to the implementation of the method in Embodiment 8 for implementation of the UE, with identical contents being not going to be described herein any further.

An embodiment further provides a UE (not shown), configured with the random access apparatus 2600 as described above.

Figure 27:
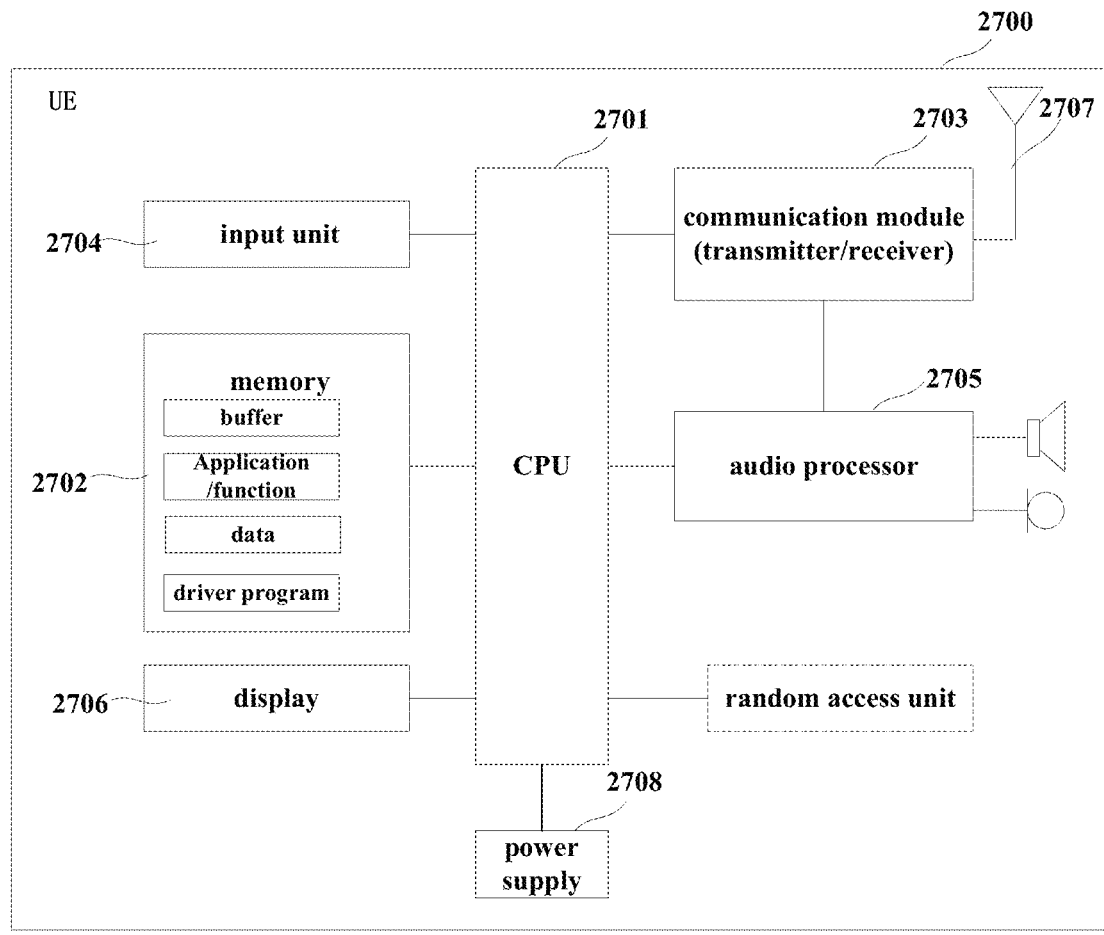
FIG. 27 is a schematic diagram of a structure of the UE of Embodiment 22 of this disclosure.

An embodiment further provides a UE. FIG. 27 is a schematic diagram of a structure of the UE of Embodiment 22 of this disclosure. As shown in FIG. 27, a UE 2700 may include a central processing unit (CPU) 2701 and a memory 2702, the memory 2702 being coupled to the central processing unit 2701. For example, the memory 2702 may store various data, and furthermore, it may store a program for data processing, and execute the program under control of the central processing unit 2701, so as to perform random access.

In one implementation, the functions of the apparatus 2600 may be integrated into the central processing unit 2701. For example, the central processing unit 2701 may be configured to carry out the random access method as described in Embodiment 8.

For example, the central processing unit 2701 may be configured to: receive a random access response message; wherein, the random access response message contains a plurality of MAC subheaders or MAC sub-data units to which the MAC subheaders correspond; and wherein, a position of an MAC subheader or an MAC sub-data unit to which the MAC subheader corresponds containing a random backoff indication message is located at the last of all the MAC subheaders or MAC subdata units to which the MAC subheaders correspond.

In an embodiment, reference may be made to Embodiment 7 for a format of the random access response message.

For example, the central processing unit 2701 may be configured to: read in turn the plurality of MAC subheaders or MAC sub-data units to which the MAC subheaders correspond contained in the random access response message, and determine that reading of the random access response message ends when an MAC subheader or an MAC sub-data unit to which the MAC subheader corresponds containing a random backoff indication message is read.

And furthermore, reference may be made to Embodiment 7 for other configuration manners of the central processing unit 2701, which shall not be described herein any further.

In another implementation, the above apparatus 2600 and the central processing unit 2701 may be configured separately. For example, the apparatus 2600 may be configured as a chip connected to the central processing unit 2701, such as the random access unit shown in FIG. 27, with its functions being realized under control of the central processing unit 2701.

As shown in FIG. 27, the UE 2700 may further include a communication module 2703, an input unit 2704, a display 2706, an audio processor 2705, an antenna 2707, and a power supply 2708, etc. For example, functions of the above components are similar to those in the related art, and shall not be described herein any further. It should be noted that the UE 2700 does not necessarily include all the parts shown in FIG. 27, and furthermore, the UE 2700 may include parts not shown in FIG. 27, and the related art may be referred to.

It can be seen from the above embodiment that via RAPID contained in a random access response message, it may be implicitly indicated that the data type of the random access response message may be used to indicate the acknowledgement of an on-demand system information request, thereby solving the problems in the related art, and saving bit information.

It can be seen from the above embodiment that when the UE reads the MAC sub-header containing the random backoff indication or its corresponding MAC sub-PDU, it acknowledges that there exists no MAC sub-header or its corresponding MAC sub-PDU subsequently, so that the read operation may be ended, thereby solving the problem in the related art.

In an LTE system, as each base station in a cell may generate 64 random access preamble sequences according to a root sequence and a cyclic shift sequence generated by the root sequence, a field of 6 bits in a random access response message is used to indicate a sequence index identifier of a random access preamble sequence transmitted by a UE.

In a future wireless communication system, such as a 5G or new radio (NR) system, in order to support more complex service scenarios, it is necessary to expand the number of random access preamble sequences. Therefore, the number of random access preamble sequences may be greater than 64. Hence, the field of 6 bits in the random access response message is unable to indicate the sequence index identifier of the random access preamble sequence.

To this end, an embodiment provides a random access method and apparatus and a communication system, in which a random access preamble sequence is indicated by two parts of indication information, so as to be adapted for expansion of the number of random access preamble sequences, thereby solving the problem existing in the related art.

The above two methods shall be respectively described below with reference to the accompanying drawings.

Embodiment 23

Embodiment 23 of this disclosure provides a random access method, which is applicable to a network device side, such as being applicable to an apparatus making response to a random access procedure initiated by a UE.

Figure 28:
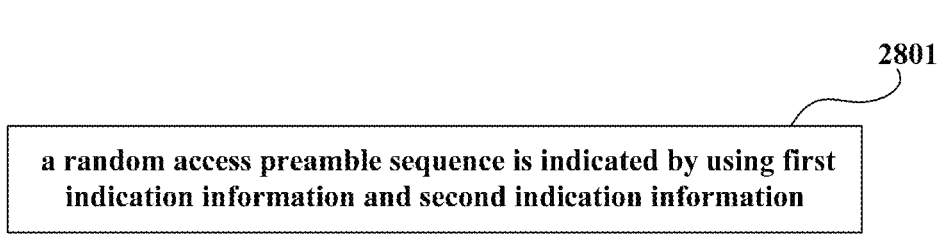
FIG. 28 is a flowchart of the random access method of Embodiment 23 of this disclosure.

FIG. 28 is a flowchart of the random access method of the embodiment of this disclosure. As shown in FIG. 28, the method includes:

block 2801: a random access preamble sequence is indicated by using first indication information and second indication information.

For example, relevant information of the random access preamble sequence is indicated by using the first indication information and the second indication information. For example, the relevant information may be a sequence index identifier, such as an RAPID, and the RAPID may be indicated by using the first indication information and the second indication information. However, the embodiment is not limited thereto, and the relevant information may also be other information of the random access preamble sequence.

In an embodiment, the relevant information may be a field of a first predetermined number (N) of bits.

For example, the first indication information may be carried via a random access response message. For example, the first indication information is a field of a second predetermined number N1 of bits, and higher bits (such as N1 bits) of the relevant information may be indicated by the first indication information, or lower order bits (such as N1 bits) of the relevant information may be indicated by the first indication information.

For example, N1 may be equal to 6, that is, higher 6 bits or lower 6 bits of the sequence index of the random access preamble sequence are indicated according to a field 6 bits in the random access response message (msg.2) (e.g. which may be an existing RAPID field of 6 bits). However, the embodiment is not limited thereto, and N1 may also be greater than 6 (for example, it may be an existing RAPID field of 6 bits+other extended fields), or may be less than 6 (for example, it may be a part of bits of an existing RAPID).

In an embodiment, scrambling information may be used to scramble a random access response message transmitted to a UE side; wherein, the second indication information is indicated by using the scrambling information.

For example, the scrambling information is a random access radio network temporary identifier (RA-RNTI).

For example, the second indication information is a field of a third predetermined number N2 of bits, and higher bits (such as higher N2 bits) of the relevant information are indicated by the second indication information, or lower bits (such as lower N2 bits) of the relevant information are indicated by the second indication information.

In an embodiment, the second indication information may be indicated by using a computation method of the scrambling information, in other words, the scrambling information is computed according to the second indication information. For example, an existing computation method of an RA-RNTI is: RA-RNTI=1+t_id+10×f_id; where, t_id is a subframe index, and f_id is a time-frequency resource index in the subframe. In an embodiment, the second indication information needs to be taken into account in computing the RA-RNTI.

For example, RA-RNTI=1+t_id+10×f_id+X; where, X may be a decimal value of N2 bits. For example, when N2=2 and is 00, X=0, when it is 01, X=1, when it is 10, X=2, and when it is 11, X=3; and N2 may also other values, which shall not be enumerated herein any further;

where, N, N1 and N2 are positive integers.

The above computation formula of the RA-RNTI is illustrative only, and the embodiment is not limited thereto.

It can be seen from the above embodiment that the random access preamble sequence is indicated by two parts of indication information, so as to be adapted for expansion of the number of random access preamble sequences, thereby solving the problem existing in the related art.

Embodiment 24

Embodiment 24 of this disclosure provides a random access method, which is applicable to a UE side, such as being applicable to an apparatus initiating a random access procedure.

Figure 29:
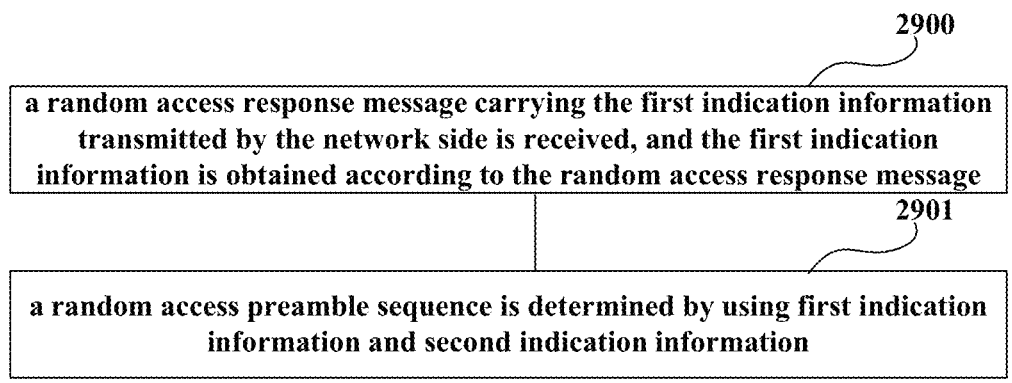
FIG. 29 is a flowchart of the random access method of Embodiment 24 of this disclosure.

FIG. 29 is a flowchart of the random access method of an embodiment. As shown in FIG. 29, the method includes:

block 2901: a random access preamble sequence is determined by using first indication information and second indication information.

For example, relevant information of the random access preamble sequence is indicated by using the first indication information and the second indication information. For example, the relevant information may be a sequence index identifier, such as an RAPID, and the RAPID may be indicated by using the first indication information and the second indication information.

In an embodiment, the relevant information may be a field of a first predetermined number (N) of bits.

How to determine the random access preamble sequence by using the first indication information and the second indication information shall be respectively described below.

About the second indication information:

In an embodiment, the UE determines the random access preamble sequence according to the second indication information in the following manner: according to the second indication information, determining descrambling information for descrambling a random access response message transmitted by a network side, success of descrambling of the descrambling information determined according to the second indication information denoting success of check of a part of relevant information (such as an RAPID) of the random access preamble sequence (i.e. being in consistence with a corresponding part of the relevant information of the random access preamble sequence transmitted by the UE); wherein, the descrambling information is a random access radio network temporary identifier.

For example, the second indication information is a field of a third predetermined number N2 of bits, and higher bits (such as higher N2 bits) of the relevant information are indicated by the second indication information, or lower bits (such as lower N2 bits) of the relevant information are indicated by the second indication information. For example, when the descrambling information determined according to the second indication information is successfully descrambled, it denotes that check of higher bits or lower bits of the relevant information (such as an RAPID) of the random access preamble sequence is successful (i.e. being identical to corresponding higher bits or lower bits of the relevant information of the random access preamble sequence transmitted by the UE).

In an embodiment, the descrambling information may be computed according to the second indication information. For example, an existing computation method of an RA-RNTI is: RA-RNTI=1+t_id+10×f_id; where, t_id is a subframe index, and f_id is a time-frequency resource index in the subframe. In an embodiment, the second indication information needs to be taken into account in computing the RA-RNTI.

For example, RA-RNTI=1+t_id+10×f_id+X; where, X may be a decimal value of N2 bits. For example, when N2=2 and is 00, X=0, when it is 01, X=1, when it is 10, X=2, and when it is 11, X=3; and N2 may also other values, which shall not be enumerated herein any further.

The above computation formula of the RA-RNTI is illustrative only, and the embodiment is not limited thereto.

About the first indication information:

In an embodiment, before block 2901, the method may further include:

block 2900: a random access response message carrying the first indication information transmitted by the network side is received, and the first indication information is obtained according to the random access response message.

In an embodiment, the first indication information is a field of a second predetermined number N1 of bits, and higher bits (such as N1 bits) of the relevant information may be indicated by the first indication information, or lower order bits (such as N1 bits) of the relevant information may be indicated by the first indication information.

For example, N1 may be equal to 6, that is, higher 6 bits or lower 6 bits of the sequence index of the random access preamble sequence are indicated according to a field 6 bits in the random access response message (msg. 2). However, the embodiment is not limited thereto, and N1 may also be greater than 6 (for example, it may be an existing RAPID field of 6 bits+other extended fields), or may be less than 6 (for example, it may be a part of bits of an existing RAPID).

For example, the UE reads the random access response message, such as determining the first indication information according to the RAPID field in the random access response message. The UE may determine the random access preamble sequence according to the first indication information in the following manner: comparing the read first indication information with the other part of the relevant information of the random access preamble sequence transmitted by the UE, consistence of the first indication information with the other part of the relevant information denoting that check of the other part of the relevant information of the random access preamble sequence is successful. For example, the first indication information is compared with higher bits or lower bits of the relevant information (such as an RAPID) of the random access preamble sequence transmitted by the UE, and when a comparison result is consistent, it shows that the check is successful (that is, it is identical to the higher bits or lower bits of the relevant information of the random access preamble sequence transmitted by the UE).

In reading the random access response message, it is indicated that descrambling according to the second indication information is successful, that is, it is determined according to the second indication information that check of a part of the relevant information of the random access preamble sequence is successful, and it is determined according to the first indication information that check of the other part of the relevant information of the random access preamble sequence is successful, that is, the relevant information (such as an RAPID) of the random access preamble sequence is identical to the relevant information (such as an RAPID) of the random access preamble sequence transmitted by the UE, indicating that random access response data (RAR) in the random access response message are successfully received, and also indicating that the random access response data in the random access response message are transmitted to the UE itself, but not transmitted to other UE.

Where, N, N1 and N2 are positive integers.

It can be seen from the above embodiment that the random access preamble sequence is indicated by two parts of indication information, so as to be adapted for expansion of the number of random access preamble sequences, thereby solving the problem existing in the related art.

Embodiment 25

Embodiment 25 provides a random access apparatus. As a principle of the apparatus for solving problems is similar to that of the method in Embodiment 23, reference may be made to the implementation of the method in Embodiment 23 for implementation of the apparatus, with identical contents being not going to be described herein any further.

Figure 30:
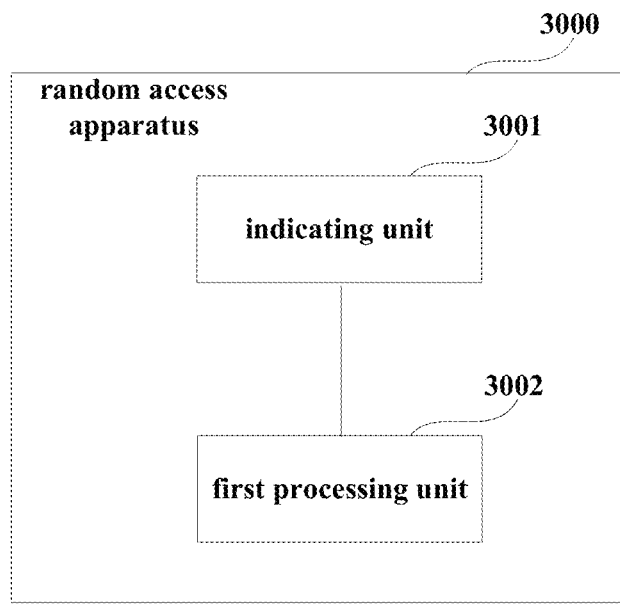
FIG. 30 is a schematic diagram of the random access apparatus of Embodiment 25 of this disclosure.

FIG. 30 is a schematic diagram of the random access apparatus of Embodiment 25 of this disclosure. As shown in FIG. 30, a random access apparatus 3000 includes:

an indicating unit 3001 configured to indicate a random access preamble sequence by using first indication information and second indication information.

For example, the first indication information is carried via a random access response message.

In an embodiment, the apparatus may further include:

a first processing unit 3002 configured to scramble a random access response message transmitted to a UE side by using scrambling information; wherein, the second indication information is indicated by using the scrambling information.

For example, the scrambling information is a random access radio network temporary identifier.

For example, the indicating unit 3001 indicates a relevant information of the random access preamble sequence by using the first indication information and the second indication information, the relevant information being a sequence index identifier, and being a field of a first predetermined number of bits.

For example, the first indication information and the second indication information may be bit fields, and reference may be made to Embodiment 23 for particular methods for expressing them, which shall not be described herein any further.

It can be seen from the above embodiment that the random access preamble sequence is indicated by two parts of indication information, so as to be adapted for expansion of the number of random access preamble sequences, thereby solving the problem existing in the related art.

Embodiment 26

Embodiment 14 provides a network device. As a principle of the device for solving problems is similar to that of the method in Embodiment 23, reference may be made to the implementation of the method in Embodiment 23 for implementation of the device, with identical contents being not going to be described herein any further.

An embodiment further provides a network device (not shown), configured with random access apparatus 3000 as described above.

Figure 31:
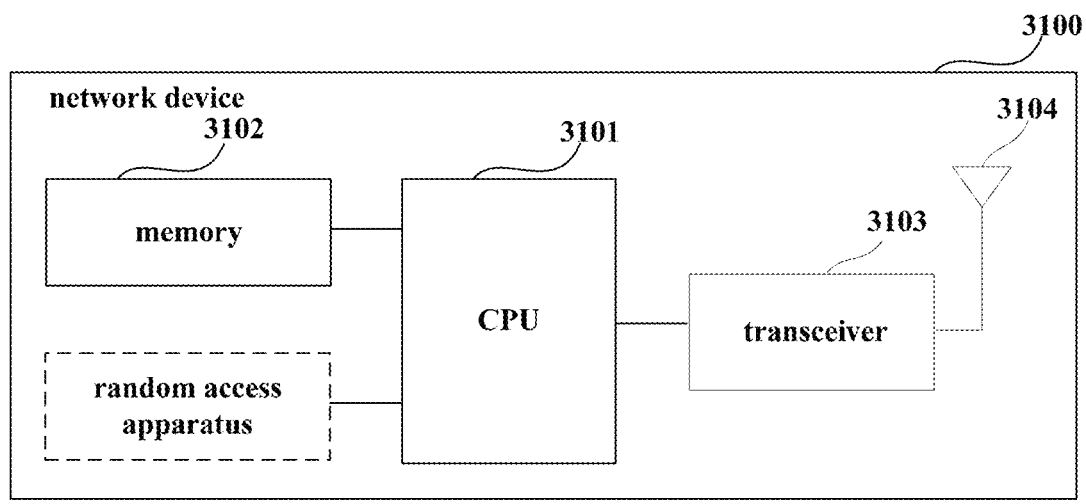
FIG. 31 is a schematic diagram of a structure of the network device of Embodiment 26 of this disclosure.

Embodiment 26 further provides a network device. FIG. 31 is a schematic diagram of a structure of the network device of Embodiment 26 of this disclosure. As shown in FIG. 31, a network device 3100 may include a central processing unit (CPU) 3101 and a memory 3102, the memory 3102 being coupled to the central processing unit 3101. For example, the memory 3102 may store various data, and furthermore, it may store a program for data processing, and execute the program under control of the central processing unit 3101, so as to transmit related information.

In one implementation, the functions of the apparatus 3000 may be integrated into the central processing unit 3101. For example, the central processing unit 3101 may be configured to carry out the random access method as described in Embodiment 23.

For example, the central processing unit 3101 may be configured to: indicate a random access preamble sequence by using first indication information and second indication information.

For example, the first indication information is carried via a random access response message.

For example, the central processing unit 3101 may be configured to: scramble a random access response message transmitted to a UE side by using scrambling information; wherein, the second indication information is indicated by using the scrambling information.

For example, the scrambling information is a random access radio network temporary identifier.

For example, the first indication information and the second indication information may be bit fields, and reference may be made to Embodiment 23 for particular methods for expressing them, which shall not be described herein any further.

And furthermore, reference may be made to Embodiment 23 for a particular configuration manner of the central processing unit 3101, which shall not be described herein any further.

In another implementation, the apparatus 3000 and the central processing unit 3101 may be configured separately. For example, the apparatus 3000 may be configured as a chip connected to the central processing unit 3101, such as a unit shown in FIG. 31, with its functions being realized under control of the central processing unit 3101.

Furthermore, as shown in FIG. 31, the network device 3100 may include a transceiver 3103, and an antenna 3104, etc. For example, functions of the above components are similar to those in the related art, and shall not be described herein any further. It should be noted that the network device 3100 does not necessarily include all the parts shown in FIG. 31, and furthermore, the network device 3100 may include parts not shown in FIG. 31, and the related art may be referred to.

It can be seen from the above embodiment that the random access preamble sequence is indicated by two parts of indication information, so as to be adapted for expansion of the number of random access preamble sequences, thereby solving the problem existing in the related art.

Embodiment 27

Embodiment 27 provides a random access apparatus. As a principle of the apparatus for solving problems is similar to that of the method in Embodiment 24, reference may be made to the implementation of the method in Embodiment 24 for implementation of the apparatus, with identical contents being not going to be described herein any further.

Figure 32:
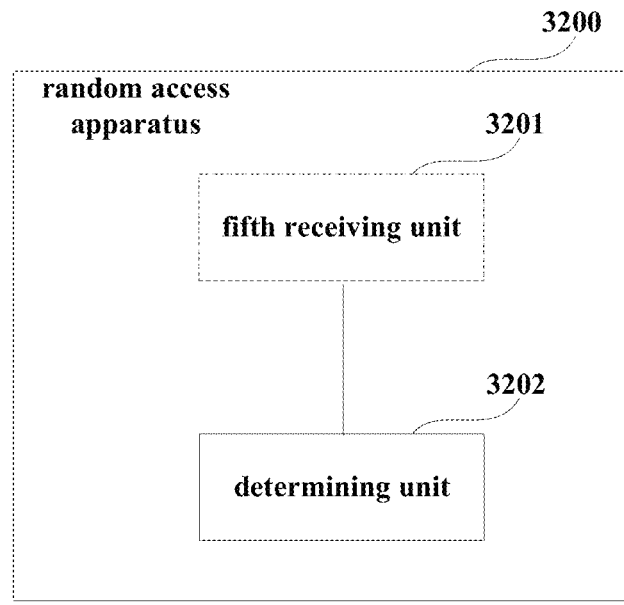
FIG. 32 is a schematic diagram of the random access apparatus of Embodiment 27 of this disclosure.

FIG. 32 is a schematic diagram of the random access apparatus of Embodiment 27 of this disclosure. As shown in FIG. 32, a random access apparatus 3200 includes:

a determining unit 3201 configured to determine a random access preamble sequence by using first indication information and second indication information.

In an embodiment, the apparatus may further include:

a fifth receiving unit 3202 configured to receive a random access response message carrying the first indication information transmitted by a network side, the determining unit 3201 obtaining the first indication information according to the random access response message.

For example, according to the second indication information, the determining unit determines descrambling information descrambling the random access response message transmitted by the network side, so as to determine the random access preamble sequence.

For example, the descrambling information is a random access radio network temporary identifier.

For example, the relevant information is a sequence index identifier, and is a field of a first predetermined number of bits.

For example, the first indication information and the second indication information may be bit fields, and reference may be made to Embodiment 24 for particular methods for expressing them, which shall not be described herein any further.

In an embodiment, reference may be made to blocks 2900-2901 in Embodiment 24 for implementation of the determining unit 3201 and the fifth receiving unit 3202, which shall not be described herein any further.

It can be seen from the above embodiment that the random access preamble sequence is indicated by two parts of indication information, so as to be adapted for expansion of the number of random access preamble sequences, thereby solving the problem existing in the related art.

Embodiment 28

An embodiment provides a UE. As a principle of the UE for solving problems is similar to that of the method in Embodiment 24, reference may be made to the implementation of the method in Embodiment 24 for implementation of the UE, with identical contents being not going to be described herein any further.

An embodiment further provides a UE (not shown), configured with the random access apparatus 3200 as described above.

Figure 33:
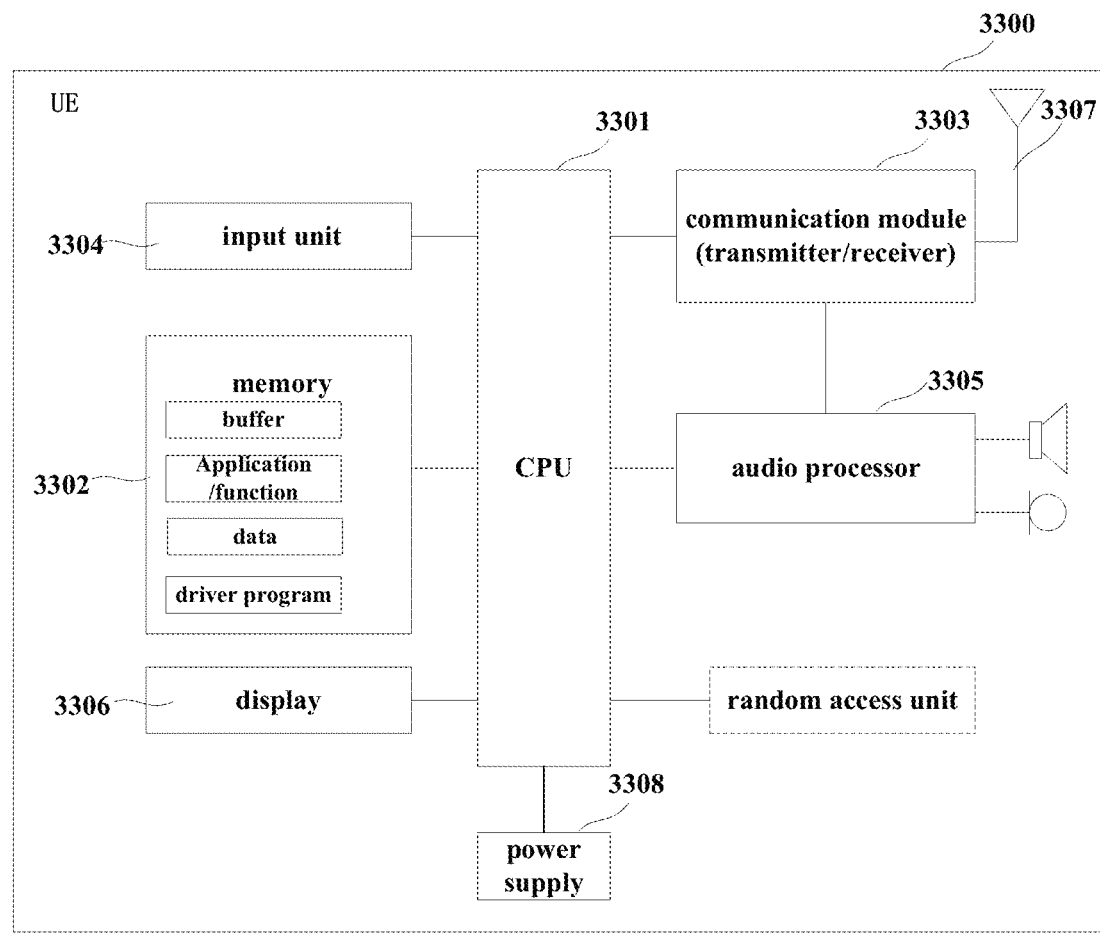
FIG. 33 is a schematic diagram of a structure of the UE of Embodiment 28 of this disclosure.

An embodiment further provides a UE. FIG. 33 is a schematic diagram of a structure of the UE of Embodiment 28 of this disclosure. As shown in FIG. 33, a UE 3300 may include a central processing unit (CPU) 3301 and a memory 3302, the memory 3302 being coupled to the central processing unit 3301. For example, the memory 3302 may store various data, and furthermore, it may store a program for data processing, and execute the program under control of the central processing unit 3301, so as to perform random access.

In one implementation, the functions of the apparatus 3200 may be integrated into the central processing unit 3301. For example, the central processing unit 3301 may be configured to carry out the random access method as described in Embodiment 24.

For example, the central processing unit 3301 may be configured to: determine a random access preamble sequence by using first indication information and second indication information.

For example, the central processing unit 3301 may be configured to: receive a random access response message carrying the first indication information transmitted by a network side, and obtain the first indication information according to the random access response message.

For example, the central processing unit 3301 may be configured to: according to the second indication information, determine descrambling information descrambling the random access response message transmitted by the network side, so as to determine the random access preamble sequence.

For example, the descrambling information is a random access radio network temporary identifier. And the relevant information is a sequence index identifier, and is a field of a first predetermined number of bits.

For example, the first indication information and the second indication information may be bit fields, and reference may be made to Embodiment 24 for particular methods for expressing them, which shall not be described herein any further.

Furthermore, reference may be made to Embodiment 24 for other configurations of the central processing unit 3301, which shall not be described herein any further.

In another implementation, the above apparatus 3200 and the central processing unit 3301 may be configured separately. For example, the apparatus 3200 may be configured as a chip connected to the central processing unit 3301, such as the random access unit shown in FIG. 33, with its functions being realized under control of the central processing unit 3301.

Furthermore, as shown in FIG. 33, the UE 3300 may include a communication module 3303, an input unit 3304, a display 3306, an audio processor 3305, an antenna 3307, and a power supply 3308, etc. For example, functions of the above components are similar to those in the related art, and shall not be described herein any further. It should be noted that the UE 3300 does not necessarily include all the parts shown in FIG. 33, and furthermore, the UE 3300 may include parts not shown in FIG. 33, and the related art may be referred to.

It can be seen from the above embodiment that the random access preamble sequence is indicated by two parts of indication information, so as to be adapted for expansion of the number of random access preamble sequences, thereby solving the problem existing in the related art.

Embodiment 29

Figure 34:
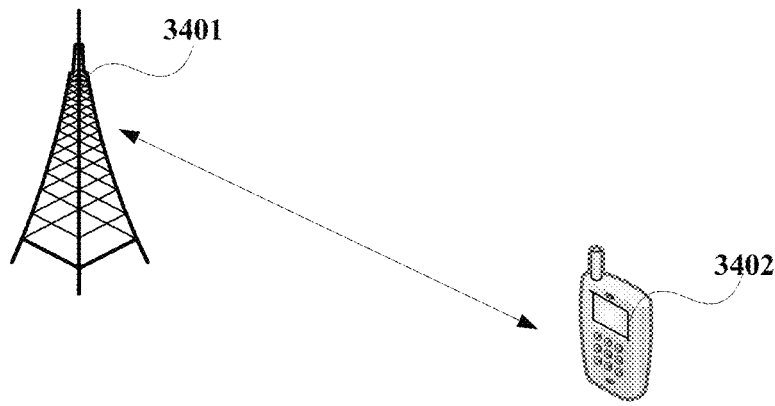
FIG. 34 is a schematic diagram of a structure of the communication system of Embodiment 29 of this disclosure.

FIG. 34 is a schematic diagram of a structure of the communication system of Embodiment 29 of this disclosure. As shown in FIG. 34, the communication system 3400 includes a network device 3401 at a network side and a UE 3402.

For example, constitutions of the network device 3401 and the UE 3402 may be as described in embodiments 10 and 12, the contents of which being incorporated herein, and being not going to be described herein any further.

For example, the constitutions of the network device 3401 and the UE 3402 may also be as described in embodiments 14 and 16, the contents of which being incorporated herein, and being not going to be described herein any further.

For example, reference may be made to the related art for the network device 3401, and the constitution of the UE 3402 may be as described in Embodiment 18, the contents of which being incorporated herein, and being not going to be described herein any further.

For example, constitutions of the network device 3401 and the UE 3402 may be as described in embodiments 20 and 22, the contents of which being incorporated herein, and being not going to be described herein any further.

Figure 35:
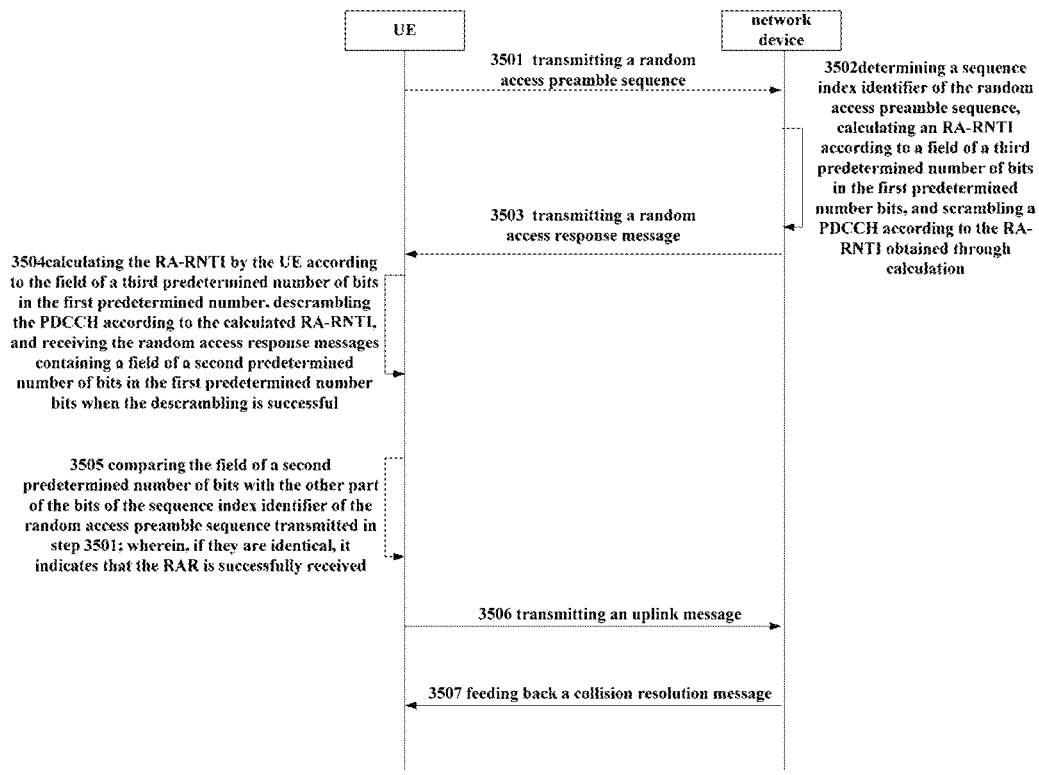
FIG. 35 is a flowchart of the random access method of Embodiment 29 of this disclosure.

For example, constitutions of the network device 3401 and the UE 3402 may be as described in embodiments 26 and 28, their workflows being as shown in FIG. 35 below, and the contents of which being incorporated herein, and being not going to be described herein any further.

FIG. 35 is a flowchart of the random access method of an embodiment. As shown in FIG. 35, the method includes:

block 3501: the UE transmits a random access preamble sequence (msg.1) to the network side;

block 3502: the network side receives the random access preamble sequence transmitted by the UE, determines a sequence index identifier of the random access preamble sequence, the sequence index identifier being a field of a first predetermined number of bits, calculates an RA-RNTI according to a field of a third predetermined number of bits in the first predetermined number bits, and scramble a PDCCH according to the RA-RNTI obtained through calculation;

block 3503: a random access response message (msg.2) containing a field of a second predetermined number of bits in the first predetermined number bits is transmitted to the UE;

block 3504: the UE calculates the RA-RNTI according to the field of a third predetermined number of bits in the first predetermined number, descramble the PDCCH according to the calculated RA-RNTI, and receives the random access response messages (msg.2) containing a field of a second predetermined number of bits in the first predetermined number bits when the descrambling is successful;

wherein, manners of the network side and the UE for calculating the RA-RNTI are identical, the formula may be predefined according to standards, and reference may be made to embodiments 23 and 24 for a particular implementation, which shall not be described herein any further;

wherein, successful descrambling denotes that check of a part of the bits (higher bits or lower bits) denoted by a sequence index is successful;

block 3505: the UE compares the field of a second predetermined number of bits with the other part of the bits (lower or higher) of the sequence index identifier of the random access preamble sequence transmitted in block 3501; wherein, if they are identical, it indicates that the RAR is successfully received;

block 3506: the UE transmits an uplink message (msg.3) to the network side on a designated resource in the RAR when the reception is successful, the uplink message containing a UE ID; for example, msg.3 may be a radio resource control connection request (RRC connection request); and block 3507: the network side receives the uplink message, and feeds back a collision resolution message (msg.4) to the UE succeeding in random access according to the UE ID contained therein.

In an embodiment, when the random access is non-contention random access, before block 3501, the method may further include a block (not shown): transmitting indication information by the network side to the UE, the indication message being used to indicate a time-frequency position of a random access preamble sequence used in the random access procedure and a used access resource. Reference may be made to the related art, which shall not be described here any further.

An embodiment of the present disclosure provides a computer readable program, which, when executed in an information transmission apparatus or a UE, will cause the information transmission apparatus or the UE to carry out the information transmission method as described in Embodiment 2.

An embodiment of the present disclosure provides a computer storage medium, including a computer readable program, which will cause an information transmission apparatus or a UE to carry out the information transmission method as described in Embodiment 2.

An embodiment of the present disclosure provides a computer readable program, which, when executed in an information transmission apparatus or a network device, will cause the information transmission apparatus or the network device to carry out the information transmission method as described in Embodiment 1.

An embodiment of the present disclosure provides a computer storage medium, including a computer readable program, which will cause an information transmission apparatus or a network device to carry out the information transmission method as described in Embodiment 1.

An embodiment of the present disclosure provides a computer readable program, which, when executed in a random access apparatus or a network device, will cause the random access apparatus or the network device to carry out the random access method as described in Embodiment 4.

An embodiment of the present disclosure provides a computer storage medium, including a computer readable program, which will cause a random access apparatus or a network device to carry out the random access method as described in Embodiment 4.

An embodiment of the present disclosure provides a computer readable program, which, when executed in a random access apparatus or a UE, will cause the random access apparatus or the UE to carry out the random access method as described in Embodiment 5.

An embodiment of the present disclosure provides a computer storage medium, including a computer readable program, which will cause a random access apparatus or a UE to carry out the random access method as described in Embodiment 5.

An embodiment of the present disclosure provides a computer readable program, which, when executed in a random access apparatus or a UE, will cause the random access apparatus or the UE to carry out the random access method as described in Embodiment 6.

An embodiment of the present disclosure provides a computer storage medium, including a computer readable program, which will cause a random access apparatus or a UE to carry out the random access method as described in Embodiment 6.

An embodiment of the present disclosure provides a computer readable program, which, when executed in a random access apparatus or a network device, will cause the random access apparatus or the network device to carry out the random access method as described in Embodiment 7.

An embodiment of the present disclosure provides a computer storage medium, including a computer readable program, which will cause a random access apparatus or a network device to carry out the random access method as described in Embodiment 7.

An embodiment of the present disclosure provides a computer readable program, which, when executed in a random access apparatus or a UE, will cause the random access apparatus or the UE to carry out the random access method as described in Embodiment 8.

An embodiment of the present disclosure provides a computer storage medium, including a computer readable program, which will cause a random access apparatus or a UE to carry out the random access method as described in Embodiment 8.

An embodiment of the present disclosure provides a computer readable program, which, when executed in a random access apparatus or a network device, will cause the random access apparatus or the network device to carry out the random access method as described in Embodiment 23.

An embodiment of the present disclosure provides a computer storage medium, including a computer readable program, which will cause a random access apparatus or a network device to carry out the random access method as described in Embodiment 23.

An embodiment of the present disclosure provides a computer readable program, which, when executed in a random access apparatus or a UE, will cause the random access apparatus or the UE to carry out the random access method as described in Embodiment 24.

An embodiment of the present disclosure provides a computer storage medium, including a computer readable program, which will cause a random access apparatus or a UE to carry out the random access method as described in Embodiment 24.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The random access method in the random access apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 13-27 and 30-33 may either correspond to software modules of procedures of a computer program, or correspond to hardware modules. Such software modules may respectively correspond to the steps shown in FIGS. 1, 3-10, 12 and 28-29. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 13-27 and 30-33 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 13-27 and 30-33 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A terminal comprising:
  a transmitter configured to transmit a random access preamble sequence for a system information (SI) request to a network side;
  a receiver configured to receive a random access response message; and
  a controller configured to determine that a Medium Access Control (MAC) sub-header indicates acknowledgement of the SI request when the random access response message includes a Medium Access Control (MAC) sub-data unit (sub PDU) having a MAC sub-header containing a random access preamble sequence identifier of the random access preamble sequence without corresponding MAC Random Access Response in the random access response message, wherein the random access preamble sequence identifier corresponds to one of a plurality of random access preamble sequences in a sequence identifier set, wherein the sequence identifier set is preconfigured for the SI request, and wherein the SI is sent in a dedicated manner from the network side.

2. The terminal according to claim 1, wherein the random access preamble sequence includes the random access preamble sequence identifier.

3. The terminal according to claim 2, wherein the controller selects the random access preamble sequence from the plurality of random access preamble sequences in the sequence identifier set, wherein the sequence identifier set is preconfigured for the SI request.

4. The terminal according to claim 1, wherein the transmitter is configured to transmit a random access preamble sequence using a resource in a random access resource set.

5. The terminal according to claim 1, wherein the random access preamble sequence identifier is contained in the random access response message.

6. A base station comprising:
  a receiver configured to receive a random access preamble sequence, wherein the random access preamble is for a system information (SI) request; and
  a transmitter configure to transmit a random access response message, wherein the random access response message includes a Medium Access Control (MAC) sub-data unit (sub PDU) having a MAC sub-header containing a random access preamble sequence identifier of the random access preamble sequence without corresponding MAC Random Access Response in the random access response message, wherein the random access preamble sequence identifier corresponds to one of a plurality of random access preamble sequences in a sequence identifier set, wherein the sequence identifier set is preconfigured for the SI request, and wherein the SI is sent in a dedicated manner from a network side.

7. The base station according to claim 6, wherein the random access preamble sequence corresponds to the random access preamble sequence identifier.

8. The base station according to claim 6, wherein the receiver receives the random access preamble sequence in a resource in a random access resource set.

9. The base station according to claim 6, wherein the random access preamble sequence identifier is included in the random access response message.

10. A communication system, comprising:
  a base station configured to transmit a random access response message; and
  a terminal configured to:
    transmit a random access preamble for a system information (SI) request to a network side,
    receive the random access response message and
    determine that a Medium Access Control (MAC) sub-header indicates acknowledgement of the SI request when the random access response message includes a Medium Access Control (MAC) sub-data unit (sub PDU) having a MAC sub-header containing a random access preamble sequence identifier of the random access preamble sequence without corresponding MAC Random Access Response in the random access response message, wherein the random access preamble sequence identifier corresponds to one of a plurality of random access preamble sequences in a sequence identifier set, wherein the sequence identifier set is preconfigured for the SI request, and wherein the SI is sent in a dedicated manner from the network side.

* * * * *